(12) United States Patent
Kojima et al.

(10) Patent No.: US 9,562,792 B2
(45) Date of Patent: Feb. 7, 2017

(54) ANGLE DETECTOR, MOTOR DRIVE CONTROLLER, AND MOTOR DEVICE

(71) Applicants: Shinichi Kojima, Osaka (JP); Katsuhisa Furuse, Hyogo (JP)

(72) Inventors: Shinichi Kojima, Osaka (JP); Katsuhisa Furuse, Hyogo (JP)

(73) Assignee: RICOH COMPANY, LTD., Tokyo (JP)

( * ) Notice: Subject to any disclaimer, the term of this patent is extended or adjusted under 35 U.S.C. 154(b) by 93 days.

(21) Appl. No.: 14/693,247

(22) Filed: Apr. 22, 2015

(65) Prior Publication Data

US 2015/0311837 A1 Oct. 29, 2015

(30) Foreign Application Priority Data

Apr. 25, 2014 (JP) ................. 2014-091824

(51) Int. Cl.
*H02K 29/12* (2006.01)
*G01B 7/00* (2006.01)
*G01D 5/244* (2006.01)
*G01D 5/14* (2006.01)
*G01D 5/247* (2006.01)
*G01D 3/024* (2006.01)

(52) U.S. Cl.
CPC .......... *G01D 5/24485* (2013.01); *G01D 5/145* (2013.01); *G01D 3/024* (2013.01); *G01D 5/247* (2013.01)

(58) Field of Classification Search
CPC ....... H02P 6/16; G01D 5/24485; G01D 5/145; G01D 3/024; G01D 5/247; G01P 3/487; G01P 3/481
USPC ......... 318/400.37, 778; 324/207.12; 310/111
See application file for complete search history.

(56) References Cited

U.S. PATENT DOCUMENTS 7,548,056 B2 * 6/2009 Voisine .................. G01D 5/247
324/207.12
2013/0099708 A1 4/2013 Shimizu et al.
2013/0106326 A1 5/2013 Kamatani et al.
2013/0106327 A1 5/2013 Kamatani et al.
(Continued)

FOREIGN PATENT DOCUMENTS

JP 2013-099022 5/2013
JP 2013-099023 5/2013

OTHER PUBLICATIONS

U.S. Appl. No. 14/509,343, filed Oct. 8, 2014.

*Primary Examiner* — Bentsu Ro
*Assistant Examiner* — Zemenay Truneh
(74) *Attorney, Agent, or Firm* — Cooper & Dunham LLP

(57) ABSTRACT

An angle detector includes an intersection phase detector to compare each pair of multiple sensor signals or multiple sensor processed signals generate and output each intersection phase detection signal indicating a phase at which the signal level difference of the each pair is a first maximum hysteresis error after signal levels of signals of the each pair match, an intersection level detector to detect each intersection level and generate and output multiple intersection level signals indicating the detected intersection level, a signal selector to single out a selection signal of the either of the multiple sensor signals or the multiple sensor processed signals; a phase detector to detect that a signal level of the selection signal selected by the signal selector has reached a threshold level and a threshold level adjuster to adjust the threshold level based on the intersection level signal and the first maximum hysteresis error.

10 Claims, 16 Drawing Sheets

(56) References Cited

U.S. PATENT DOCUMENTS

2014/0347040 A1 11/2014 Kawase
2014/0354271 A1 12/2014 Kawase
2014/0361715 A1 12/2014 Murata
2014/0365167 A1 12/2014 Shimizu
2015/0009517 A1 1/2015 Shimizu

* cited by examiner

FIG. 2

| INTER-SECTION DETECTION SIGNAL | SWITCHING CONDITION TO HIGH (Hi) LEVEL | RETENTION CONDITION OF SIGNAL LEVEL | SWITCHING CONDITION TO LOW (Low) LEVEL |
|---|---|---|---|
| UV | U1−V1 ≥ Vhys1 | −Vhys1 ≤ U1 − V1 < + Vhys1 | U1−V1 < −Vhys1 |
| VW | V1−W1 ≥ Vhys1 | −Vhys1 ≤ V1 − W1 < + Vhys1 | V1−W1 < −Vhys1 |
| WU | W1−U1 ≥ Vhys1 | −Vhys1 ≤ W1 − U1 < + Vhys1 | W1−U1 < −Vhys1 |

FIG. 3

| INPUT CONDITION OF EACH SIGNAL | SELECTED SIGNAL | SIGNAL PHASE (°) |
|---|---|---|
| UV = Hi, VW = WU = Low | W1 | 150 − 210 |
| UV = VW = Hi, WU = Low | V1 | −30 − 30 |
| UV = WU = Low, VW = Hi | U1 | 150 − 210 |
| UV = Low, VW = WU = Hi | W1 | −30 − 30 |
| UV = VW = Low, WU = Hi | V1 | 150 − 210 |
| UV = WU = Hi, VW = Low | U1 | −30 − 30 |

FIG. 5

| ELECTRIC ANGLE (°) | AMPLIFICATION RATE |
|---|---|
| −30.0 | −0.500 |
| −22.5 | −0.383 |
| −15.0 | −0.259 |
| −7.5 | −0.131 |
| 0 | 0 |
| 7.5 | 0.131 |
| 15.0 | 0.259 |
| 22.5 | 0.383 |
| 30.0 | 0.500 |

FIG. 11 (a)
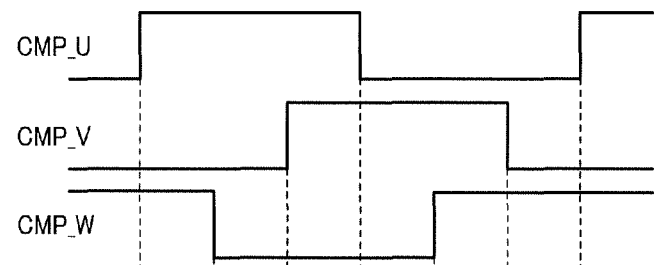
FIG. 11 (c)
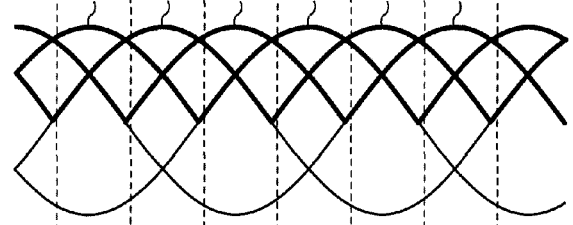
FIG. 11 (d)
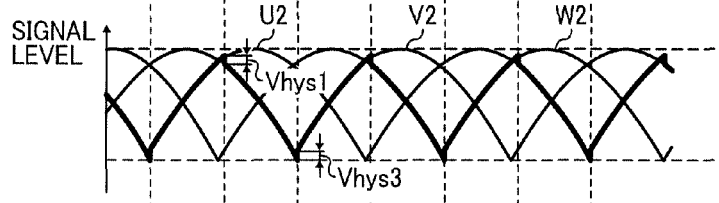
FIG. 11 (e)
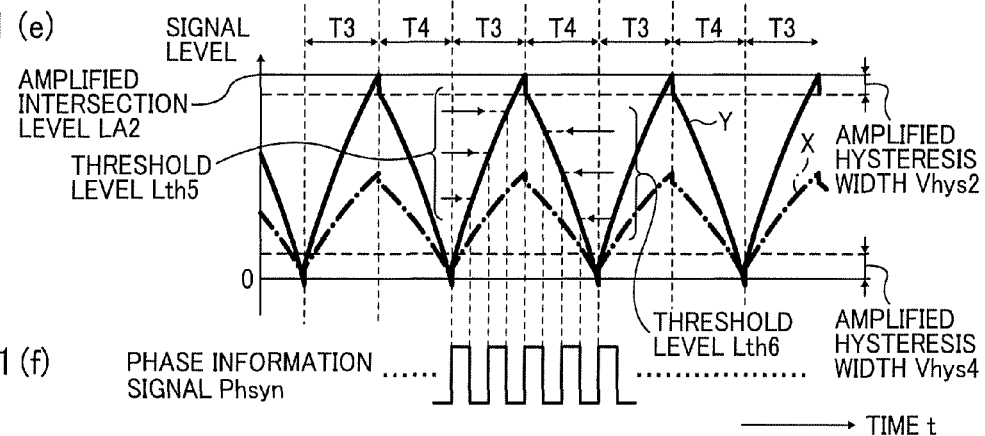
FIG. 11 (f)

ANGLE DETECTOR, MOTOR DRIVE CONTROLLER, AND MOTOR DEVICE

CROSS-REFERENCE TO RELATED APPLICATIONS

This patent application is based on and claims priority pursuant to 35 U.S.C. §119(a) to Japanese Patent Application No. 2014-091824, filed on Apr. 25, 2014, in the Japan Patent Office, the entire disclosure of which is hereby incorporated by reference herein.

BACKGROUND

Technical Field

The present invention relates to an angle detector, a motor drive controller having the angle detector, and a motor device having the motor drive controller.

Background Art

To control rotational positions of a motor by, for example, stop control of a brushless DC motor, the rotation angle of a rotor of the motor is detected. In a rotary encoder system, typically a rotary encoder is connected to a rotation axis and a two-phase pulse signal with a phase shift of one fourth of a cycle changing according to a rotation angle is output to detect a relative rotation angle from its edge detection and the two-phase high/low state.

SUMMARY

According to the present disclosure, provided is an improved angle detector which includes an intersection phase detector to compare each pair of either multiple sensor signals or multiple sensor processed signals obtained by processing the multiple sensor signals with signal processing and generate and output each intersection phase detection signal indicating a phase at which a signal level difference of the each pair is a first maximum hysteresis error after signal levels of signals of the each pair match as a phase of an intersection of the each pair, each of the multiple sensor signals having a signal level corresponding to a rotational position of a rotor of a motor having multiple coils, an intersection level detector to detect each intersection level being as a signal level of each intersection and generate and output multiple intersection level signals indicating the each intersection level detected, a signal selector to single out a selection signal of the either of the multiple sensor signals or the multiple sensor processed signals; a phase detector to detect that a signal level of the selection signal selected by the signal selector has reached a threshold level corresponding to a phase of the rotor and output a phase information signal indicating the phase corresponding to the threshold level and a threshold level adjuster to adjust the threshold level based on the intersection level signal and the first maximum hysteresis error.

BRIEF DESCRIPTION OF THE SEVERAL VIEWS OF THE DRAWINGS

Various other objects, features and attendant advantages of the present invention will be more fully appreciated as the same become better understood from the detailed description when considered in connection with the accompanying drawings, in which like reference characters designate like corresponding parts throughout and wherein

FIG. 2 is a table showing intersection phase detection signals UV, VW, and WU indicating comparison results of each of sensor signals U1, V1, and W1 at an intersection phase detector 10 illustrated in FIG. 1;

FIG. 3 is a table showing signal selection conditions of a signal selector 20 illustrated in FIG. 1;

FIG. 5 is a table of electrical angle and amplitude rate of the selection signal X from the signal selector 20 illustrated in FIG. 1;

FIG. 4(b) is timing graphs illustrating intersection phase detection signals UV, VW, and WU that indicate detection of the phase of intersections of the sensor signals U1, V1, and W1 illustrated in FIG. 8(a) by the intersection phase detector 10 illustrated in FIG. 7.

FIG. 11(a) is timing graphs illustrating zero cross phase detection signals CMP_U, CMP_V, and CMP_W that detected the zero cross phase of the sensor signals U1, V1, and W1 illustrated in FIG. 9, FIG. 11(c) is waveforms illustrating sensor signals U1, V1, and W1 rectified by an inversion circuit 22 illustrated in FIG. 9 and inverted signals IU1, IV1, and IW1, FIG. 11(d) is waveforms illustrating the selection signal X selected based on the zero cross phase detection signals CMP_U, CMP_V, and CMP_W illustrated in FIG. 11(a), FIG. 11(e) is waveforms illustrating the selection signal Y obtained by amplifying the selection signal X illustrated in FIG. 11(d), and FIG. 11(f) is a timing graph illustrating a phase detection information signal Psyn indicating the comparison result of the selection signal Y, the threshold level Lth5, and the threshold level Lth6 illustrated in FIG. 11(e);

DETAILED DESCRIPTION

Figure 1:
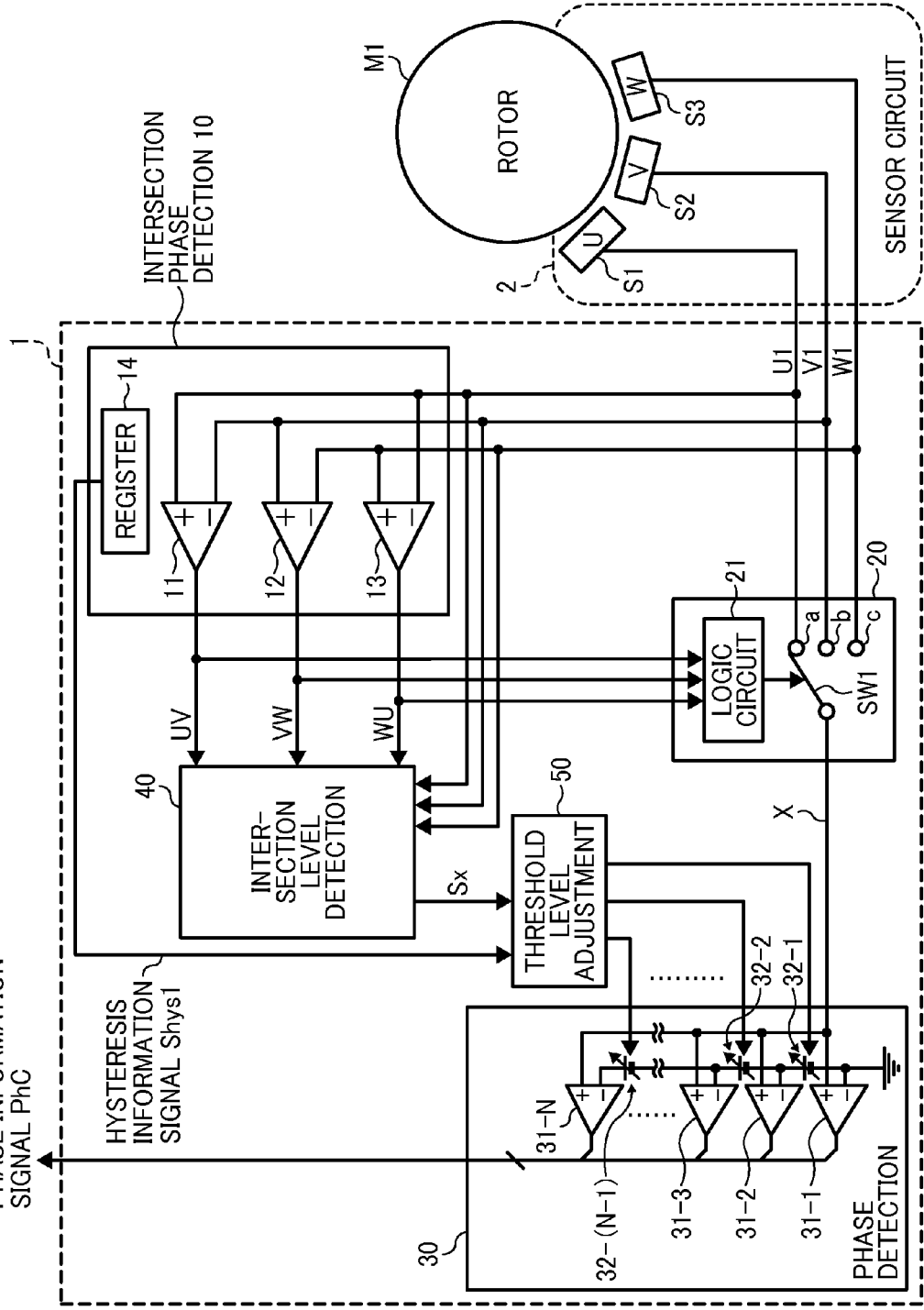
FIG. 1 is a block diagram illustrating a configuration of an angle detector 1 according to embodiment 1 of the present disclosure together with a motor M1 and a sensor circuit 2.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

According to the present invention, the rotational position of the rotor of a motor is detected with high accuracy.

Embodiments of the present disclosure are described with reference to the accompanying drawings. In the following embodiments, the same symbol is assigned to similar configuration elements.

Embodiment 1

FIG. 1 is a block diagram illustrating a configuration of an angle detector 1 according to an embodiment 1 of the present disclosure together with a motor M1 and a sensor circuit 2. In FIG. 1, the angle detector 1 includes an intersection phase detector 10, a signal selector 20, a phase detector 30, an intersection level detector 40, and a threshold level adjuster 50. The intersection phase detector 10 includes three comparators 11, 12, and 13 and a register 14. The signal selector 20 has a logic circuit 21 and a switch SW1. The phase detector 30 has a multiple number N of comparators 31-1 to 31-N and a multiple number N-1 of comparators 32-1 to 32-(N-1).

In FIG. 1, the motor M1 includes, for example, a brushless DC motor and the sensor circuit 2 is arranged around the rotor of the motor M1. The sensor circuit 2 has sensors S1 to S3 and detects the rotation angles of U phase, V phase, and W phase of the motor M1 set with an electrical angle shift (for example, 120°) by each sensor of S1 to S3. The sensors S1 to S3 are, for example, magnetic sensors formed of Hall elements, which detect magnetic flux density changing with the rotation of the motor M1. The sensor circuit 2 outputs the sensor signals U1, V1, and W1, which are the detection results of the sensors S1 to S3, to the intersection phase detector 10, the signal selector 20, and the intersection level detector 40.

Comparators 11, 12, and 13 of the intersection phase detector 10 are formed of hysteresis comparators having maximum hysteresis errors Vhys1's having individual particular levels. The comparators 11, 12, and 13 generate output signals Vout's of high level (Hi) when a signal level difference Vin obtained by subtracting a signal level input into an inversion input terminal from a signal level input into a non-inversion input terminal is equal to or greater than Vhys1. After the output signal Vout is high level, when the signal level difference Vin satisfies the following relation: Signal level—Vhys1≤Vin<Vhys1, each comparator 11, 12, and 13 generates an output signal Vout having a high level. On the other hand, after the output signal Vout is low level, when the signal level difference Vin satisfies the following relation: Signal level—Vhys1≤Vin<Vhys1, each comparator 11, 12, and 13 generates an output signal Vout having a low level. Each comparator 11, 12, and 13 generates an output signals Vout of low level (Low) when the signal level difference Vin is less than −Vhys1. Hysteresis information indicating the maximum hysteresis error Vhys1 of each comparator 11, 12, and 13 is written on the register 14.

In the intersection phase detector 10, the comparator 11 compares the signal level of the sensor signal U1 with the sensor signal V1 to generate an intersection phase detection signal UV indicating the phase (timing) of the intersection of the sensor signals U1 and V1. Like the comparator 11, the comparator 12 generates an intersection phase detection signal VW indicating the phase of the intersection of the sensor signals V1 and W1 by comparing the sensor signals V1 and W1 and the comparator 13 generates an intersection phase detection signal WU indicating the phase of the intersection of the sensor signals W1 and U1 by comparing the sensor signals W1 and U1.

FIG. 2 is a table showing intersection phase detection signals UV, VW, and WU indicating the comparison results of the sensor signals U1, V1, and W1 in the intersection phase detector 10 illustrated in FIG. 1. As illustrated in FIG. 2, the comparator 11 generates a intersection phase detection signal UV of high level when the signal level difference U1−V1 satisfies the following relation: U1−V1≥Vhys1. After the intersection phase detection signal UV is high level, when the signal level difference U1−V1 satisfies the following relation: Signal level—Vhys1≤U1−V1<Vhys1, the comparator 11 generates an intersection phase detection signal UV of high level. After the intersection phase detection signal UV is low level, when the signal level difference U1−V1 satisfies the following relation: Signal level—Vhys1≤U1−V1<Vhys1, the comparator 11 generates an intersection phase detection signal UV of low level. The comparator 11 generates an intersection phase detection signal UV of low level when the signal level difference U1−V1 satisfies the following relation: U1−V1<Vhys1.

The comparators 12 and 13 illustrated in FIG. 1 generate binary intersection phase detection signals VW and WU, respectively, according to FIG. 2 in the same manner as in the comparator 11. As described above, the intersection phase detector 10 compares each pair of the signals of the sensor signals U1, V1, and W1 and generates intersection phase detection signals UV, VW, and WU indicating the phase of the intersection of the signals of the each pair. After the signal levels of the signals of the each pair match, the intersection phase detector 10 detects the phase at which the signal level difference of the signals of the each pair is the maximum hysteresis error Vhys1 as the phase of the intersection (refer to FIG. 4(c)). The comparators 11, 12, and 13 of the intersection phase detector 10 output the intersection phase detection signals UV, VW, and WU, respectively, to the signal selector 20 and the intersection level detector 40.

FIG. 3 is a table showing signal selection conditions of the signal selector 20 illustrated in FIG. 1. In the signal selector 20 illustrated in FIG. 1, the sensor signals U1, V1, and W1 are input into terminals a, b, c, respectively, of the switch SW1, and a logic circuit 21 switch-controls the terminals a, b, and c of the switch SW1 based on the intersection phase detection signals UV, VW, and WU. According to the input conditions of the intersection phase detection signals UV, VW, and WU illustrated in FIG. 3, the signal selector 20 illustrated in FIG. 1 outputs a single selection signal X, which is selected from the sensor signals U1, V1, and W1, to the phase detector 30.

The intersection level detector 40 detects the signal level of the sensor signal U1 or the sensor signal V1 at rise and fall of the intersection phase detection signal UV and generates the intersection level signal Sx being as the signal level of the intersection of the sensor signals U1 and V1. The intersection level detector 40 detects the signal level of the sensor signal V1 or the sensor signal W1 at rise and fall of the intersection phase detection signal VW and generates the intersection level signal Sx being as the signal level of the intersection of the sensor signals V1 and W1. The intersection level detector 40 detects the signal level of the sensor signal W1 or the sensor signal U1 at rise and fall of the intersection phase detection signal WU and generates the intersection level signal Sx being as the signal level of the intersection of the sensor signals W1 and U1. The intersection level detector 40 outputs the intersection level signal Sx of each intersection level to the threshold level adjuster 50.

The threshold level adjuster 50 reads out the hysteresis information signal Shys1 indicating the hysteresis information of each comparator 11, 12, and 13 from the register 14. The threshold level adjuster 50 controls the voltage of each variable power supply 32-$n$ such that each threshold level set between the intersection levels of each sensor signal is shifted by the maximum hysteresis error Vhys1 based on the intersection level signal Sx and the hysteresis information signal Shys1.

In the phase detector 30 illustrated in FIG. 1, the variable power supplies 32-1 to 32-(N−1) are connected serially and generate multiple threshold levels by individually generated voltages. The comparator 31-$n$ (n is 1, 2, . . . , N) compares the selection signal X with the threshold level of the variable power supply 32-$n$ and outputs a binary signal of high level when the selection signal X is equal to or greater than the threshold level. The comparator 31-$n$ outputs a binary signal of low level when the selection signal X is less than the threshold level of the variable power supply 32-$n$. The phase detector 30 outputs each comparison resultant binary signal of all the comparators 31-1 to 31-N as the phase information signal PhC indicating that the motor M1 has rotated to a predetermined angle. As described above, the phase detector 30 detects that the signal level of the selection signal X has reached the threshold level corresponding to a phase of the rotor of the motor M1 by the comparators 31-1 to 31-N. Thus, the phase detector 30 outputs phase information signal Phc indicating the phase corresponding to the threshold level.

In the angle detector 1 configured as described above, the phase information of the rotor of the motor M1 can be detected based on the sensor signals U1, V1, and W1 from the sensors S1 to S3.

Figure 4:
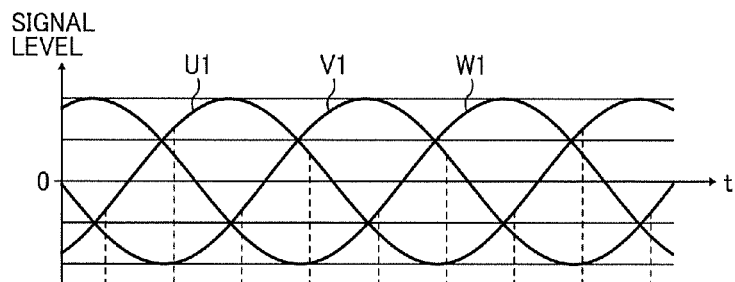
FIG. 4(a) is waveforms illustrating signal levels of sensor signals U1, V1, and W1 changing to time t illustrated in FIG. 1.
FIG. 4(b) is timing graphs illustrating intersection phase detection signals UV, VW, and WU that indicate detection of the phase of intersections of the sensor signals U1, V1, and W1 illustrated in FIG. 4(a) by an intersection phase detector 10 illustrated in FIG. 1.
FIG. 4(c) is waveforms illustrating a selection signal X selected from the sensor signals U1, V1, and W1 illustrated in FIG. 4(a) based on the intersection phase detection signal UV, VW, and WU illustrated in FIG. 4(b)
FIG. 4(d) is waveforms illustrating threshold level Lth1 and Lth2 adjusted to correspond the maximum hysteresis error Vhys1 of the selection signal X illustrated in FIG. 4(c)
FIG. 4(e) is a timing graph illustrating a phase detection information signal Psyn indicating the comparison results of the selection signal X and the threshold level Lth1 and Lth2 illustrated in FIG. 4(d)
Figure 4:
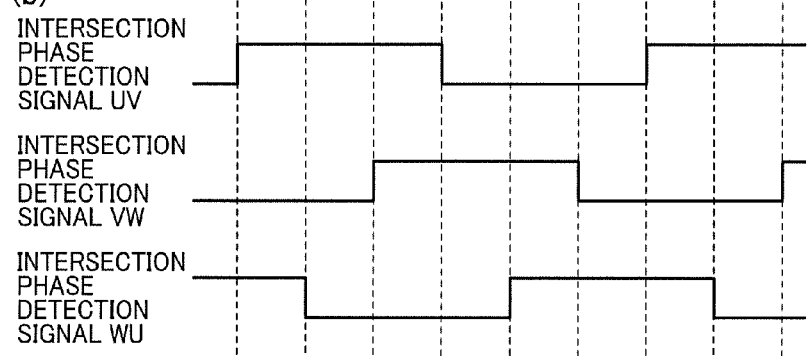
Figure 4:
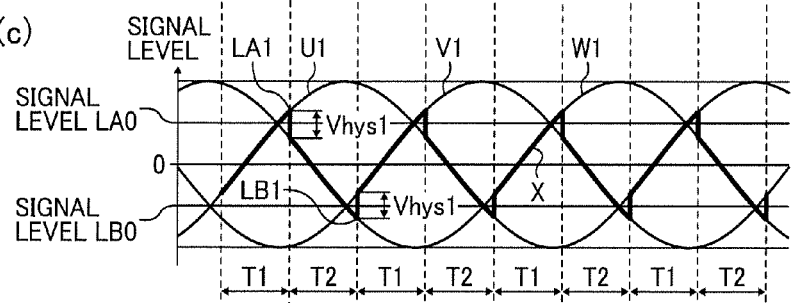
Figure 4:
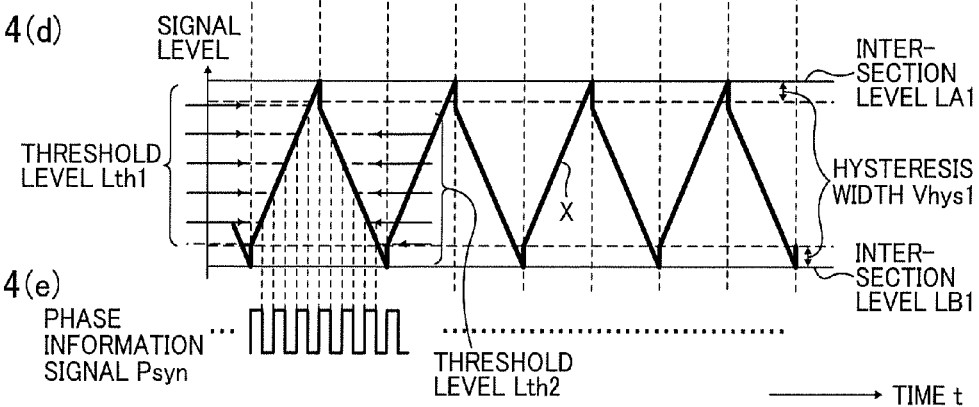
Figure 4:

FIG. 4(a) is waveforms indicating the change of the signal level of each sensor signal U1, V1, and W1 illustrated in FIG. 1 to time t. In FIG. 4, the wave forms of the signal levels over the time t of the sensor signals U1, V1, and W1 are sine waves having the same amplitude. Each sensor signal U1, V1, and W1 are output with an electrical angle shift of 120° by the arrangement of each sensor S1, S2, and S3.

FIG. 4(b) is timing graphs illustrating the intersection phase detection signals UV, VW, and WU that detected each intersection of the sensor signals U1, V1, and W1 illustrated in FIG. 4(a) by the intersection phase detector 10 illustrated in FIG. 1. In FIG. 4(b), the intersection phase detector 10 outputs the intersection phase detection signals UV, VW, and WU by comparing the sensor signals U1, V1, and W1 illustrated in FGI. 4(a) according to the conditions shown in the table illustrated in FIG. 2. Therefore, the detection timing of the intersection at which the signal level of each of the intersection phase detection signals UV, VW, and WU switches is shifted behind due to the hysteresis of the comparators 11, 12, and 13 by the period corresponding to the maximum hysteresis error Vhys1 in comparison with the actual timing of each intersection.

FIG. 4(c) is waveforms illustrating the selection signal X selected from the sensor signals U1, V1, and W1 illustrated in FIG. 4(a) based on the intersection phase detection signals UV, VW, and WU illustrated in FIG. 4(b). Thereafter, according to the input conditions shown in the table illustrated in FIG. 3, the signal selector 20 illustrated in FIG. 1 obtains the selection signal X by selection from the sensor signals U1, V1, and W1 for each phase section regulated by switching each intersection phase detection signal UV, VW, and WU. The selection signal X is ideally consisted of (1) a 60° section from the sine wave phase of 150° to 210° of the sensor signal W1, (2) a 60° section from the sine wave phase of −30° to 30° of the sensor signal V1, (3) a 60° section from the sine wave phase of 150° to 210° of the sensor signal U1, (4) a 60° section from the sine wave phase of −30° to 30° of the sensor signal W1, (5) a 60° section from the sine wave phase of 150° to 210° of the sensor signal V1, and (6) a 60° section from the sine wave phase of −30° to 30° of the sensor processed signal U1.

That is, the phase section T1 of from the phase −30° to 30° of each sensor signal U1, V1, and W1 and the phase section T2 of from the phase 150° to 210° of each sensor signal U1, V1, and W1 are alternately connected and repeated so that the selection signal X forms an ideal triangle wave. Each phase section T1 and T2 has more linearity than 60° sections of from the sine wave phase of 30° to 90°, from the sine wave phase of 90° to 150°, from the sine wave phase of 210° to 270°, and from the sine wave phase of 270° to 310°. The phase detector 30 illustrated in FIG. 1 detects that the selection signal X has reached a particular threshold level in each phase section of T1 and T2.

FIG. 5 is a table showing the relation between the electrical angle and the amplitude rate of the selection signal X from the signal selector 20 illustrated in FIG. 1. For example, if the phase detector 30 divides the range between the electrical angle −30° and 30° of the selection signal X into eight by 7.5°, the relation between the amplitude and the electrical angle is as shown in the table illustrated in FIG. 5. However, the amplification rate is normalized under the setting that the signal level of the amplitude center of the selected sensor signals U1, V1, and W1 is zero (zero cross level) and the amplitude level at the electrical angle of 90° is 1. The threshold level of the phase detector 30 is set based on each amplitude rate for the sine wave amplitude according to FIG. 5. Incidentally, since the electrical angles −30° and 30° can be detected by the intersection phase detection signals UV, VW, and WU, the threshold levels corresponding to those are not necessarily set.

For the ideal selection signal X described above, the angle detector 1 can malfunction by detection noise at switching timing for each phase section. For example, when the motor M1 rotates slowly, the detection noise has an impact since the gradient of each sensor signal U1, V1, and W1 is gentle. However, by using the comparators 11, 12, and 13 having a hysteresis in the intersection phase detector 10, it is possible to suppress the malfunction by imparting a margin to the switching of each phase section. However, due to the hysteresis of the comparators 11, 12, and 13, the waveform of the selection signal X deviates from an ideal triangular form. As illustrated in FIG. 4(*c*), the intersection level LA1 is detected in the fall of each intersection phase detection signal UV, VW, and WU and is increased by the hysteresis in comparison with the actual signal level LA0 to be detected. In addition, the intersection level LB1 is detected in the rise of each intersection phase detection signal UV, VW, and WU and is decreased by the hysteresis in comparison with the actual signal level LB0 to be detected. Therefore, the phase of the rotational position of the motor M1 is detected with an error if the threshold level for the ideal selection signal X is used.

FIG. 4(*d*) is a waveform illustrating the threshold level Lth1 and Lth2 adjusted corresponding to the maximum hysteresis error Vhys1 of the selection signal X illustrated in FIG. 4(*c*). In FIG. 4(*d*), horizontal arrows to the selection signal X represent the multiple threshold levels Lth1 and Lth2. As illustrated in FIG. 4(*d*), at which the phase section T1 is switched to the phase section T2, the signal level of the selection signal X on the phase section T1 is by the maximum hysteresis error Vhys1 greater than the signal level of the selection signal X on the phase section T2. In addition, at which the phase section T2 is switched to the phase section T1, the signal level of the selection signal X on the phase section T2 is the maximum hysteresis error Vhys1 smaller than the signal level of the selection signal X on the phase section T1. As described above, at switching between the phase section T1 and T2, the selection signal X is distorted, which causes a gap corresponding to the maximum hysteresis error Vhys1 to the signal levels.

To the selection signal X having such a distorted waveform, the threshold level adjuster 50 adjusts the threshold level for each phase section T1 and T2 based on the intersection level signal Sx and the hysteresis information signal Shys1. In the phase section T1, the signal levels between the value obtained by addition of the intersection level LB1 and the maximum hysteresis error Vhys1 and the detection intersection level LA1 are equally divided to set the threshold level Lth1 for each phase. In the phase section T2, the signal levels between the value obtained by subtracting the maximum hysteresis error Vhys1 from the detection intersection level LA1 and the intersection level LB1 are equally divided to set the threshold level Lth2 for each phase.

As described above, the threshold level adjuster 50 makes an adjustment by shifting the threshold level for each phase section T1 and T2 with the maximum hysteresis error Vhys1 based on the intersection level signal Sx and the hysteresis information signal Shys1.

FIG. 4(*e*) is a timing graph illustrating the phase detection information signal Psyn indicating the comparison result of the selection signal X and the thresholds levels Lth1 and Lth2 illustrated in FIG. 4(*d*). Incidentally, the phase information signal Phsyn is obtained as a toggle signal synthesized by, for example, taking exclusive OR of the phase information signal PhC and the intersection phase detection signals UV, VW, and WU. The angle detector 1 detects that the selection signal X has reached each threshold level Lth1 and Lth2 and switches the binary of the phase information signal Phsyn. By each adjusted threshold level Lth1 and Lth2, the rotational position of the motor M1 is precisely detected without being affected by the distortion of the waveform of the selection signal X.

The angle detector 1 relating to the embodiment 1 configured as described above generates and outputs the phase information signal PhC based on the multiple sensor signals U1, V1, and W1 having signal levels corresponding to the rotational positions of the rotor of the motor M1 having multiple coils. The angle detector 1 includes the intersection phase detector 10, the intersection level detector 40, the signal selector 20, the phase detector 30, and the threshold level adjuster 50. The intersection phase detector 10 compares signals of each pair of the multiple sensor signals U1, V1, and W1. After the signal levels of the signals of the each pair match, the intersection phase detector 10 generates and outputs the intersection phase detection signals UV, VW, and WU indicating the phases at which the signal level difference of the signals of the each pair is the maximum hysteresis error Vhys1 as the phase of the intersection of the each pair. The signal level detector 40 detects the intersection level being as the signal level of each intersection and generates and outputs multiple intersection level signals Sx indicating the detected intersection levels. The signal selector 20 singles out the selection signal X from the multiple sensor signals U1, V1, and W1. The phase detector 30 detects that the signal level of the selection signal X selected by the single selector 20 has reached the threshold level corresponding to a particular phase of the rotor and outputs the phase information signal PhC indicating the phase corresponding to the detected threshold level.

The threshold level adjuster 50 adjusts the threshold levels Lyh1 and Lyh2 based on the intersection level signal Sx and the maximum hysteresis error Vhys1.

The angle detector 1 relating to the embodiment 1 uses the comparators 11 to 13 having a hysteresis to prevent malfunction caused by noises and adjusts the threshold level for distortion of the waveform of the selection signal X caused by hysteresis. Therefore, the rotational position of the rotor of a motor is detected with high accuracy.

The sensors S1 to S3 being as the magnetic sensors that detect the rotor of the motor M1 generally use Hall elements and the magnetic flux generated by the rotation of the rotor is sine wave in most cases. That is, the signals from the magnetic sensors are sine waves in most cases. However, the magnetic flux generated upon rotation of the rotor and received at a fixed magnetic sensor is not always a clean sine wave as illustrated in FIG. 4 but a distorted sine wave in some cases. In addition, due to magnetic saturation occurring when the sensing magnetic flux surpasses the tolerance of the magnetic sensor, the outputs by the magnetic sensor are saturated so that the output becomes like a trapezoidal wave in some cases. On the other hand, the angle detector 1 detects the phase in a portion where the waveform of two adjacent intersections of each sensor signal is close to a straight line, for example, a portion having a higher gradient (e.g., −30° to 30° of a sine wave phase) than the other phase sections between the other intersections, that is, a significantly straight line portion. For example, the angle detector 1 is capable of conducting multiple phase detection with high accuracy when used for sections of signal electrical angles between −60° to 60° and 120° to 240° of a sine wave or a wave form close thereto.

In FIG. 3, the selection signal X is in the section of from −30° to 30° or the section of from 150° to 210° of a sine wave phase of each signal sensor signal U1, V1, and W1 and forms a continuous signal even when the phase section is switched and the selected sensor signal is changed. Furthermore, the synthesis signal becomes a Gray code in the end since in the phase information signal PhC from the phase detector 30, the binary signals of the adjacent comparison results from each comparator 31-1 to 31-N change by turns. In addition, in FIG. 5, the phase information is obtained every electrical angle of 7.5°, which is just an example. The present disclosure is not limited thereto. For example, it is possible to obtain phase information by separating into the amplitude rate per electrical angle of 6° or 3° to obtain phase information twice and a half again as much as in the case of an electrical angle of 7.5°.

Variation Example of Embodiment 1

Figure 6:
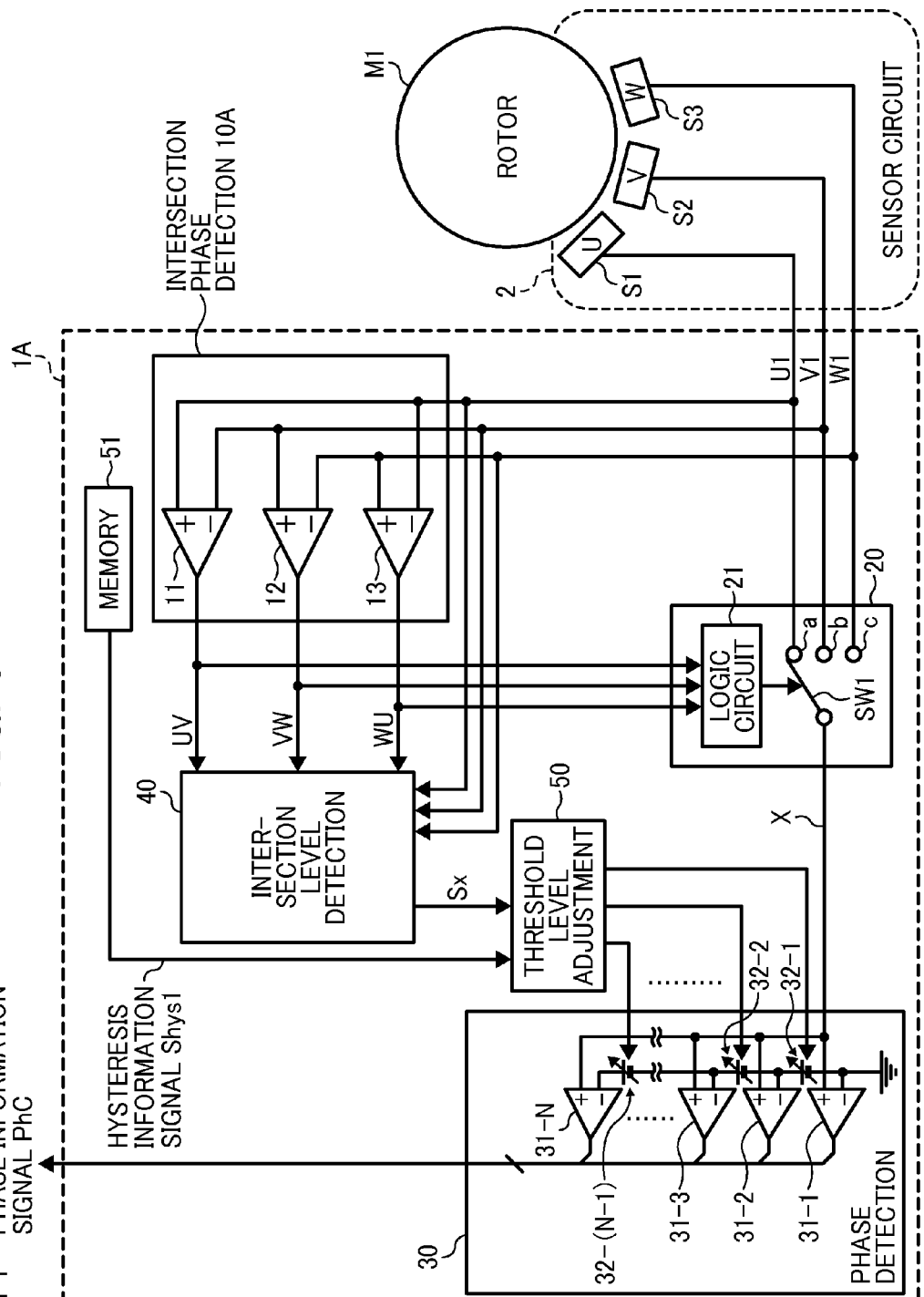
FIG. 6 is a block diagram illustrating a configuration of an angle detector 1A according to a variation example of the embodiment 1 of the present disclosure together with the motor M1 and the sensor circuit 2.

FIG. 6 is a block diagram illustrating a configuration of the angle detector 1A according to a variation example of the embodiment 1 of the present disclosure together with the motor M1 and the sensor circuit 2. The angle detector 1A relating to the variation example of the embodiment 1 has an intersection phase detector 10A instead of the intersection phase detector 10 and a memory 51 in comparison with the angle detector 1 relating to the embodiment 1. These differences are described below.

In FIG. 6, the intersection phase detector 10A has no register 14 in comparison with the intersection phase detector 10 illustrated in FIG. 1. The memory 51 stores Hysteresis information about the maximum hysteresis error Vhys1 of each comparator 11, 12, and 13.

The threshold level adjuster 50 reads out the hysteresis information signal Shys1 from the memory 51 and adjusts the threshold level of the phase detector 30 based on the maximum hysteresis error Vhys1 in the same manner as illustrated in FIG. 4.

As described above, the angle detector 1A adjusts the threshold level in the same manner as illustrated in FIG. 4 by reading out the maximum hysteresis error Vhys1 from the memory 51. In addition, the memory 51 can preliminarily store the hysteresis information about the maximum hysteresis error Vhys1. Therefore, it is possible to set the maximum hysteresis error Vhys1 as a fixed value.

Embodiment 2

Figure 7:
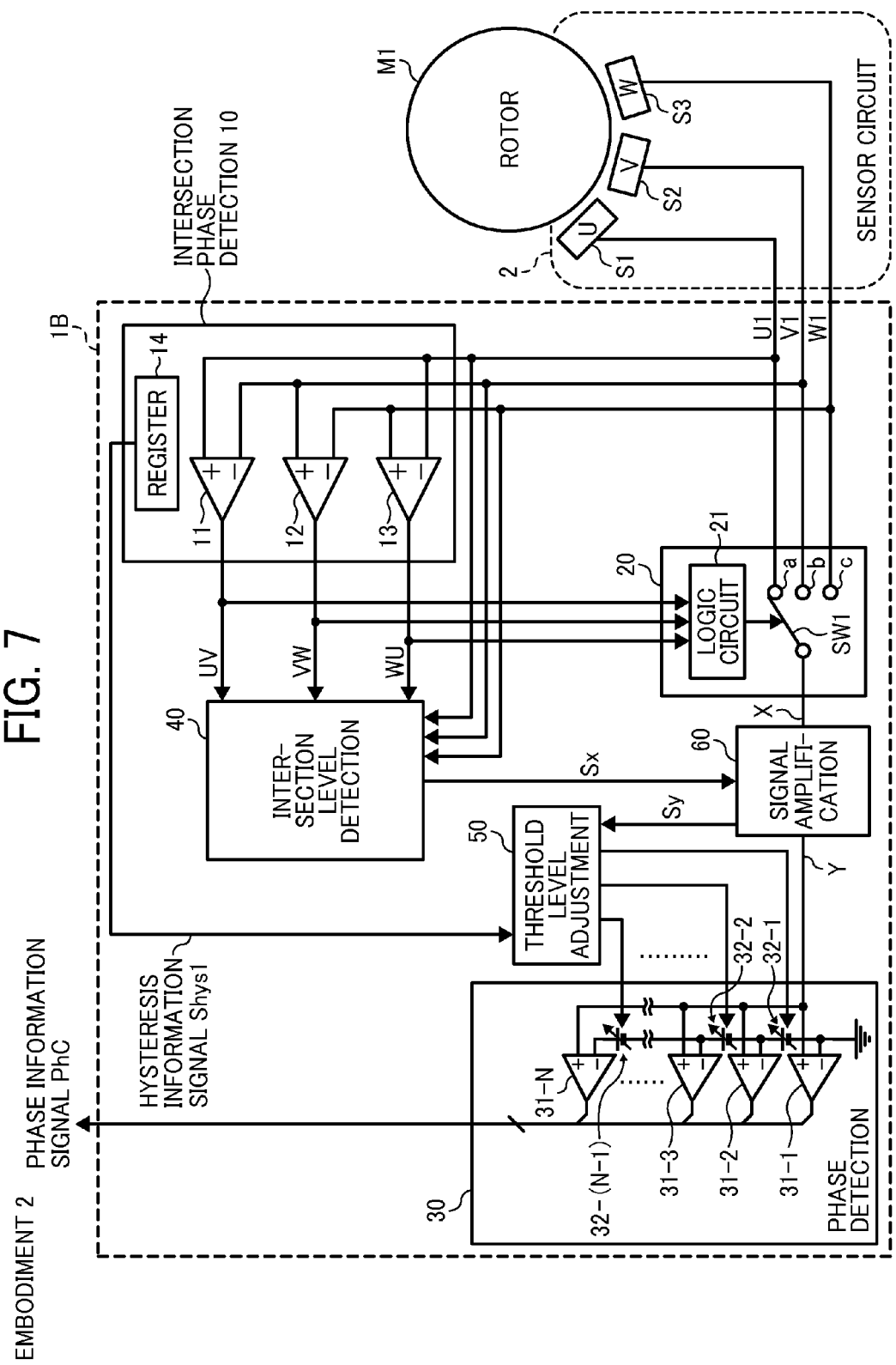
FIG. 7 is a block diagram illustrating a configuration of the angle detector 1B according to embodiment 2 of the present disclosure together with the motor M1 and the sensor circuit 2.

FIG. 7 is a block diagram illustrating a configuration of the angle detector 1B according to the embodiment 2 of the present disclosure together with the motor M1 and the sensor circuit 2. The angle detector 1B relating to the embodiment 2 further has a signal amplifier 60 in comparison with the angle detector 1 of the embodiment 1.

These differences are described below.

In FIG. 7, the signal amplifier 60 amplifies the selection signal X to match the intersection levels LA1 and LB1 with particular signal levels based on the intersection level signals Sx and outputs the amplified selected selection signal Y to the phase detector 30.

Furthermore, the signal selector 60 outputs the signal level of the selection signal Y and the amplified signal level Sy indicating the signal amplification rate a from the selection signal X to the selection signal Y to the threshold level adjuster 50. The threshold level adjuster 50 adjusts the threshold levels of the phase detector 30 based on the amplified level signal Sy and the maximum hysteresis error Shys1.

In the angle detector 1B configured as described above, the phase information of the rotor of the motor M1 can be detected based on the sensor signals U1, V1, and W1 from the sensors S1 to S3.

FIG. 8(a) is waveforms indicating the change of the signal level of each sensor signal U1, V1, and W1 illustrated in FIG. 7 to the time t. FIG. 8(b) is timing graphs illustrating the intersection phase detection signals UV, VW, and WU that detected each intersection of the sensor signals U1, V1, and W1 illustrated in FIG. 8(a) by the intersection phase detector 10 illustrated in FIG. 7. FIG. 8(c) is waveforms illustrating the selection signal X selected from the sensor signals U1, V1, and W1 illustrated in FIG. 8(a) based on the intersection phase detection signals UV, VW, and WU illustrated in FIG. 8(b). In FIGS. 8(a) to 8(c), the angle detector 1B selects the selection signal X selected from the sensor signals U1, V1, and W1 based on the intersection phase detection signals UV, VW, and WU as illustrated in FIG. 4.

FIG. 8(d) is a waveform illustrating the selection signal Y obtained by amplifying the selection signal X illustrated in FIG. 8(c). FIG. 8(e) is a timing graph illustrating the phase detection information signal Psyn indicating the comparison result of the selection signal Y and the thresholds levels Lth3 and Lth4 illustrated in FIG. 8(d).

In FIG. 8(d), the signal amplifier 60 illustrated in FIG. 7 outputs the selection signal Y obtained by amplifying the selection signal X to match the intersection levels LA1 and LB1 of the selection signal X illustrated in FIG. 8(c) with the amplified intersection levels LA2 and LB2 based on the intersection level signal Sx. At this point, the maximum hysteresis error Vhys1 of the selection signal X is also amplified. Therefore, the selection signal Y has a gap of a maximum hysteresis error Vhys2 obtained by amplifying the maximum hysteresis error Vhys1 at switching between each phase section T1 and T2.

The threshold level adjuster 50 multiplies the maximum hysteresis error Vhys1 of the hysteresis information signal Shys1 by the signal amplification rate a to calculate the amplified maximum hysteresis error Vhys2 (=Vhys1×α). In the phase section T1, the signal levels between the value obtained by addition of the intersection level LB2 and the maximum hysteresis error Vhys2 and the amplified intersection level LA2 are equally divided to set the threshold level Lth3 for each phase. In the phase section T2, the signal levels between the value obtained by subtracting the maximum hysteresis error Vhys2 from the amplified intersection level LA2 and the amplified intersection level LB2 are equally divided to set the threshold level Lth4 for each phase. The threshold level adjuster 50 adjusts the voltage of each variable power supplies 32-1 to 32-(N−1) to switch between the two threshold levels Lth3 and Lth4 for each phase section of T1 and T2.

In FIG. 8(e), in spite that in the phase information signal PhC as illustrated in FIG. 4(e), distortion of the waveform of the selection signal Y is amplified by the adjusted threshold levels Lth3 and Lth4, the rotational position of the motor M1 is precisely detected.

According to the angle detector 1B configured as described above, by detecting the phase using the selection signal Y amplified from the selection signal X, the range of the setting of each threshold level can be increased in comparison with before the amplification so that more detailed phase information is obtained. At this point, although distortion of the selection signal Y ascribable to hysteresis is amplified, the detected phase error due to the amplified maximum hysteresis error Vhys2 is suppressed by the threshold levels Lth3 and Lth 4.

Embodiment 3

Figure 9:
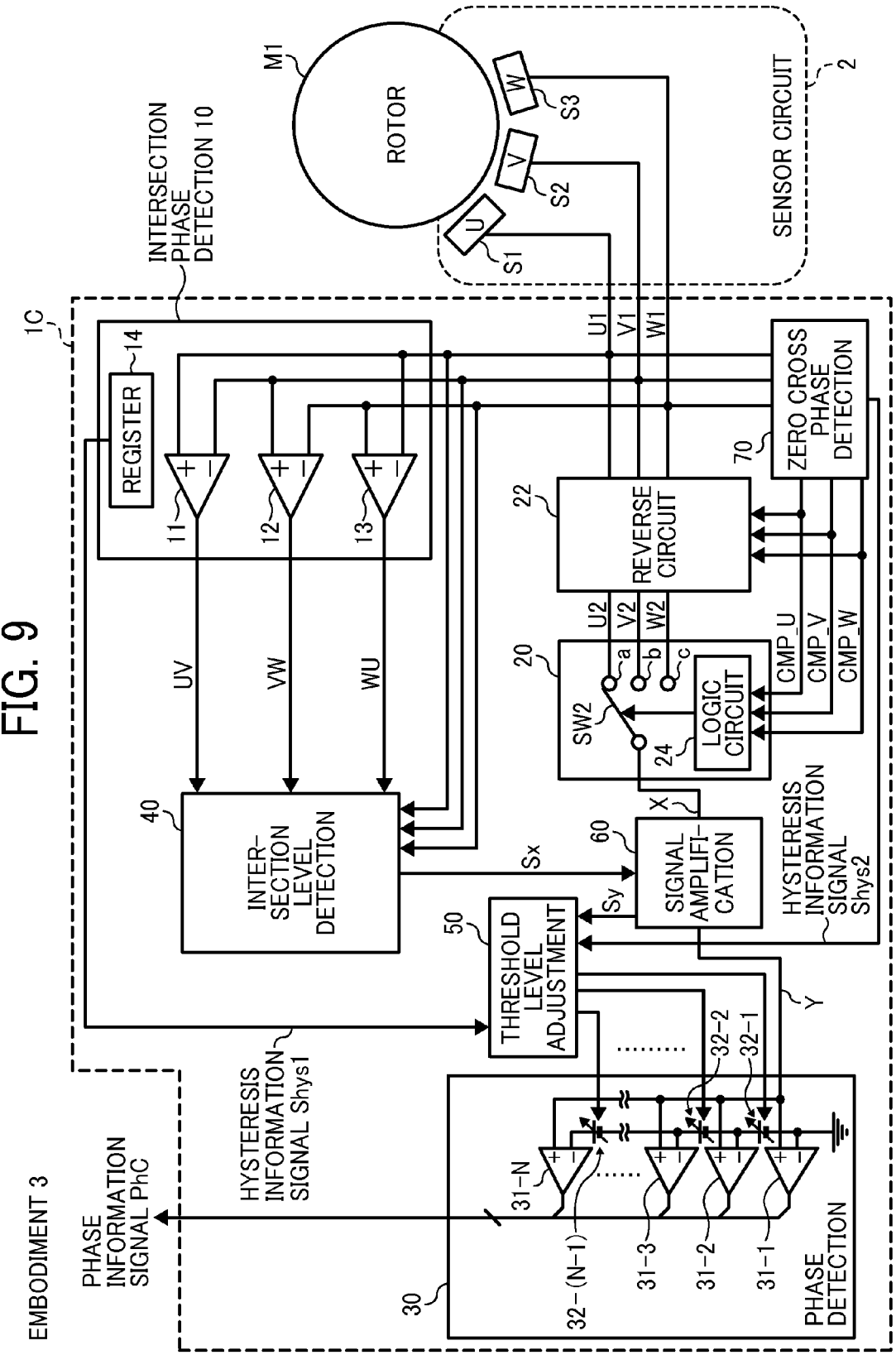
FIG. 9 is a block diagram illustrating a configuration of the angle detector 1C according to embodiment 3 of the present disclosure together with the motor M1 and the sensor circuit 2.
Figure 10:
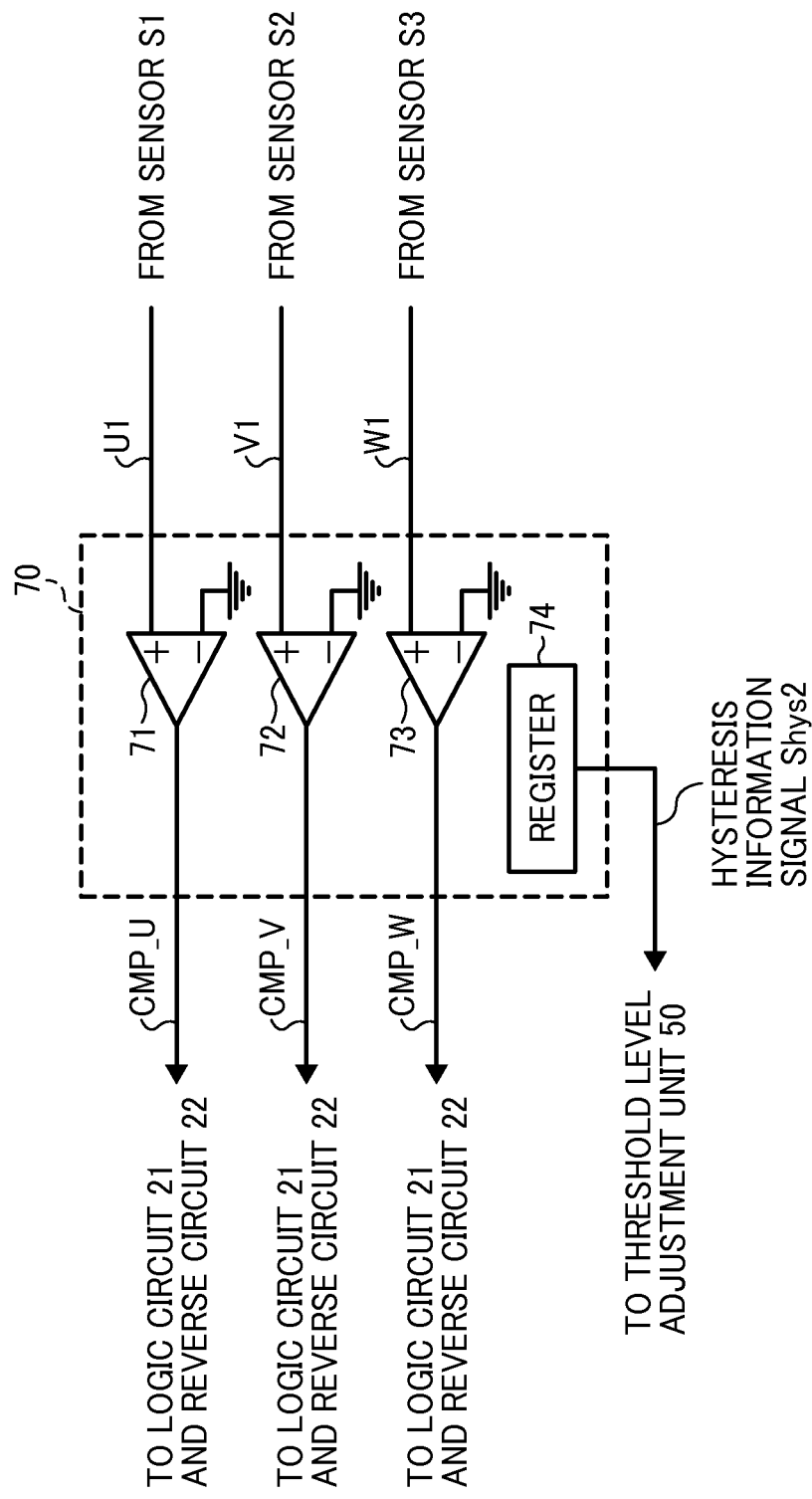
FIG. 10 is a block diagram illustrating the configuration of a zero cross phase detector 70 illustrated in FIG. 9.

FIG. 9 is a block diagram illustrating a configuration of the angle detector 1C according to embodiment 3 of the present disclosure together with the motor M1 and the sensor circuit 2. FIG. 10 is a diagram illustrating the configuration of a zero cross phase detector 70 illustrated in FIG. 9. In comparison with the angle detector 1B relating to the embodiment 2, the angle detector 1C relating to the embodiment 3 has a zero cross phase detector 70, an inversion circuit 22, an SW2, and a logic circuit 24. These differences are described below.

In FIG. 10, the intersection phase detector 70 includes three comparators 71, 72, and 73, and a register 74. The comparators 71, 72, and 73 are formed of hysteresis comparators having maximum hysteresis errors Vhys3 having individual particular values. The maximum hysteresis error Vhys3 of each comparator 71, 72, and 73 is written on the register 74.

Figure 8:
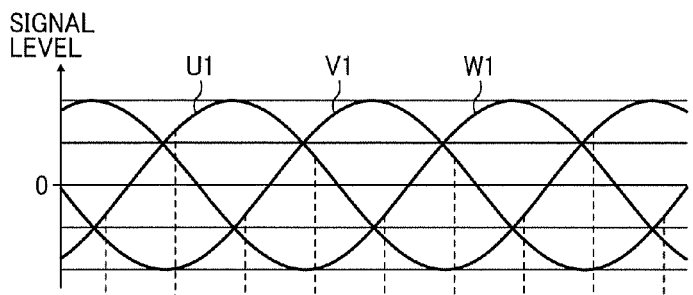
FIG. 8(a) is waveforms illustrating signal levels of sensor signals U1, V1, and W1 changing to time t illustrated in FIG. 7.
FIG. 8(c) is waveforms illustrating a selection signal X selected from the sensor signals U1, V1, and W1 illustrated in FIG. 8(a) based on the intersection phase detection signal UV, VW, and WU illustrated in FIG. 8(b)
FIG. 8(d) is waveforms illustrating a selection signal Y obtained by signal-amplifying the selection signal X illustrated in FIG. 8(c)
FIG. 8(e) is a timing graph illustrating a phase detection information signal Psyn indicating the comparison result of the selection signal Y and the threshold level Lth3 and Lth4 illustrated in FIG. 8(d)
Figure 8:
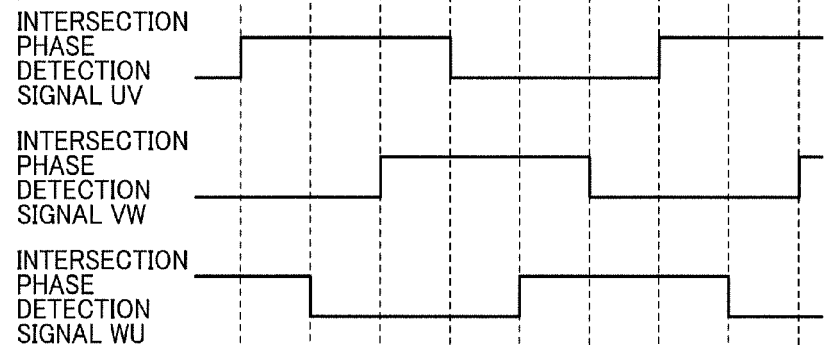
Figure 8:
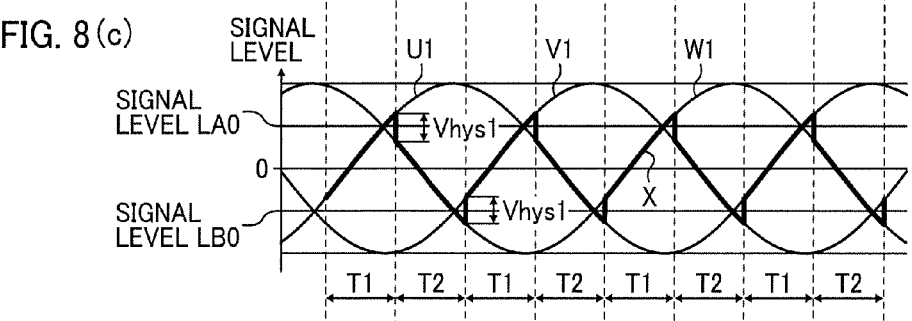
Figure 8:
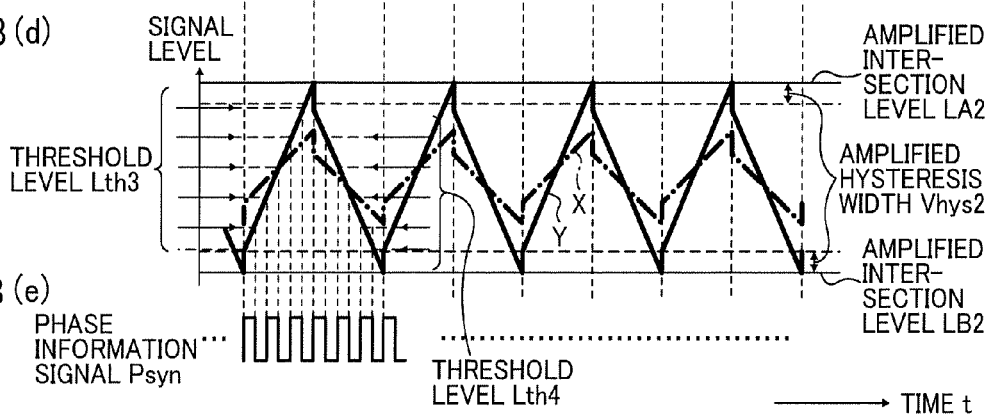
Figure 8:

In the comparator 71, the sensor signal U1 is input from the sensor S1 illustrated in FIG. 8 into the non-inversion input terminal and the inversion input terminal is grounded. The comparator 71 generates a zero cross phase detection signal CMP_U of high level when the signal level U1 satisfies the following relation: U1≥Vhys3. After the zero cross phase detection signal CMP_U is high level, when the signal level U1 satisfies the following relation: Signal level—Vhys3≤U1<Vhys3, the comparator 71 generates a zero cross phase detection signal CMP_U of high level. After the zero cross phase detection signal CMP_U is low level, when the signal level U1 satisfies the following relation: Signal level—Vhys3≤U1<Vhys3, the comparator 71 generates a zero cross phase detection signal CMP_U of low level. The comparator 71 generates the zero cross phase detection signal CMP_U when the signal level U1 satisfies the following relation: U1<−Vhys3.

In the comparator 72, the sensor signal V1 is input from the sensor S2 illustrated in FIG. 8 into the non-inversion input terminal and the inversion input terminal is grounded. The comparator 72 generates a zero cross phase detection signal CMP_V of high level when the signal level V1 satisfies the following relation: V1≥Vhys3. After the zero cross phase detection signal CMP_V is high level, when the signal level V1 satisfies the following relation: Signal level—Vhys3≤V1<Vhys3, the comparator 72 generates a zero cross phase detection signal CMP_V of high level. After the zero cross phase detection signal CMP_V is low level, when the signal level V1 satisfies the following relation: Signal level—Vhys3≤V1<Vhys3, the comparator 72 generates a zero cross phase detection signal CMP_V of low level. The comparator 72 generates the zero cross phase detection signal CMP_V of low level when the signal level V1 satisfies the following relation: V1<−Vhys3.

In the comparator 73, the sensor signal W1 is input from the sensor S3 illustrated in FIG. 8 into the non-inversion input terminal and the inversion input terminal is grounded. The comparator 73 generates a zero cross phase detection signal CMP_W of high level when the signal level W1 satisfies the following relation: W1≥Vhys3. After the zero cross phase detection signal CMP_W is high level, when the signal level W1 satisfies the following relation: Signal level—Vhys3≤W1<Vhys3, the comparator 73 generates a zero cross phase detection signal CMP_W of high level. After the zero cross phase detection signal CMP_W is low level, when the signal level W1 satisfies the following relation: Signal level—Vhys3≤W1<Vhys3, the comparator 72 generates a zero cross phase detection signal CMP_W of low level. The comparator 72 generates the zero cross phase detection signal CMP_W of low level when the signal level W1 satisfies the following relation: W1<−Vhys3.

In FIG. 9, the inversion circuit 22 inverts and rectifies the sensor signals U1, V1, and W1 based on the timing of the zero cross phase detection signals CMP_U, CMP_V, and CMP_W. The inversion circuit 22 outputs rectified sensor processed signals U2, V2, and W2 into terminals a, b, c, respectively, of the switch SW2. The logic circuit 24 switch-controls the switch SW2 to switch the terminals a, b, and c for each phase section regulated based on the intersection phase detection signals UV, VW, and WU and the zero cross phase detection signals CMP_U, CMP_V, and CMP_W. The signal selector 20 outputs the selection signal X, which is selected from the sensor signals U2, V2, and W2, to the phase detector 30.

In the angle detector 1C configured as described above, the phase information of the rotor of the motor M1 can be detected based on the sensor signals U1, V1, and W1 from the sensors S1 to S3.

FIG. 11(a) is timing graphs indicating the zero cross phase detection signals CMP_U, CMP_V, and CMP_W that detected the zero cross phases of the sensor signals U1, V1, and W1 illustrated in FIG. 9.

FIG. 11(c) is waveforms illustrating the sensor signals U1, V1, and W1 rectified by the inversion circuit 22 illustrated in FIG. 9 and inverted signals IU1, IV1, and IW1 thereof. In FIG. 11(c), the inversion circuit 22 illustrated in FIG. 9 rectifies the sensor signals U1, V1, and W1 to invert the sensor signals U1, V1, and W1 less than the zero cross level based on the zero cross phase detection signals CMP_U, CMP_V, and CMP_W illustrated in FIG. 11(a).

As a result, the inverted signals IU1, IV1, and IW1 inverted from the sensor signal U1, V1, and W1 are generated. The inversion circuit 22 generates the sensor signals U2, V2, and W2 by linking the sensor signals U1, V1, and W1 and the inverted signals IU1, IV1, and IW1. The logic circuit 24 illustrated in FIG. 9 switch-controls SW2 based on the zero cross phase detection signals CMP_U, CMP_V, and CMP_W.

FIG. 11(d) is waveforms illustrating the selection signal X selected based on based on the zero cross phase detection signals CMP_U, CMP_V, and CMP_W illustrated in FIG. 11(a). In FIG. 11(d), the logic circuit 24 illustrated in FIG. 9 conducts switch-control to sequentially select the terminals a, b, and c of the switch SW2 illustrated in FIG. 9 based on the zero cross phase detection signals CMP_U, CMP_V, and CMP_W illustrated in FIG. 11(a). To be specific, switching is conducted under the following conditions:

When CMP_U="H", CMP_V="L", and CMP_W="H" or CMP_U="L", CMP_V="L", or CMP_W="H", the terminal a (U2) is selected.

When CMP_U="H", CMP_V="L", and CMP_W="L" or CMP_U="H", CMP_V="H", or CMP_W="L", the terminal b (V2) is selected.

When CMP_U="L", CMP_V="H", and CMP_W="L" or CMP_U="L", CMP_V="H", and CMP_W="H", the terminal c (W2) is selected.

Therefore, the signal selector 20 selects the selection signal X from the sensor processed signals U2, V2, and W2. The selection signal X has different waveforms in the phase section T3 and the phase section T4. As illustrated in FIG. 11(e), at which the phase section T3 is switched to the phase section T4, the signal level of the selection signal X on the phase section T3 is the maximum hysteresis error Vhys1 greater than the signal level of the selection signal X on the phase section T4. In addition, at which the phase section T4 is switched to the phase section T3, the signal level of the selection signal X on the phase section T4 is the maximum hysteresis error Vhys3 smaller than the signal level of the selection signal X on the phase section T3.

FIG. 11(e) is waveforms illustrating the selection signal Y obtained by amplifying the selection signal X illustrated in FIG. 11(d). FIG. 11(f) is a timing graph illustrating the phase detection information signal Psyn indicating the comparison result of the selection signal Y and the thresholds levels Lth5 and Lth6 illustrated in FIG. 11(e).

In FIG. 11(e), the signal amplifier 60 illustrated in FIG. 9 outputs the selection signal Y obtained by amplifying the selection signal X referring to the zero cross level to match the intersection levels LA1 of the selection signal X illustrated in FIG. 11(d) with the amplified intersection levels LA2 based on the amplified level signal Sy. At this point, the maximum hysteresis error Vhys3 of the comparators 71, 72, and 73 of the zero cross phase detector 70 is amplified to become the amplified maximum hysteresis error Vhys4 in the same manner as in the maximum hysteresis error Vhys1 of the comparators 11, 12, and 13 of the intersection phase detector 10. Therefore, the selection signal Y has a gap of the maximum hysteresis errors Vhys2 and Vhys4 at switching between each phase section T3 and T4. The threshold level adjuster 50 shifts the threshold level by the maximum hysteresis errors Vhys2 and Vhys4 for the phase sections T3 and T4 in the same manner as in FIG. 8 and sets the threshold levels Lth5 and Lth6 in the phase sections T3 and T4. Therefore, as illustrated in FIG. 11(f), precise phase information is obtained without being affected by the distortion of the waveform of the selection signal Y.

The angle detector 1C configured as described above rectifies all the sensor signals U1, V1, and W1 to invert the signal level of the selection signal Y at the zero cross point.

Therefore, the circuit size can be reduced while substantially maintaining the width of the signal level for use in the phase detection of the selection signal Y. The angle detector 1C prevents malfunction ascribable to the detection noise by the maximum hysteresis errors Vhys1 and Vhys3 while reducing the circuit size. Moreover, the detected phase error due to the maximum hysteresis errors Vhys1 and Vhys3 is suppressed by the threshold levels Lth5 and Lth6.

Embodiment 4

Figure 12:
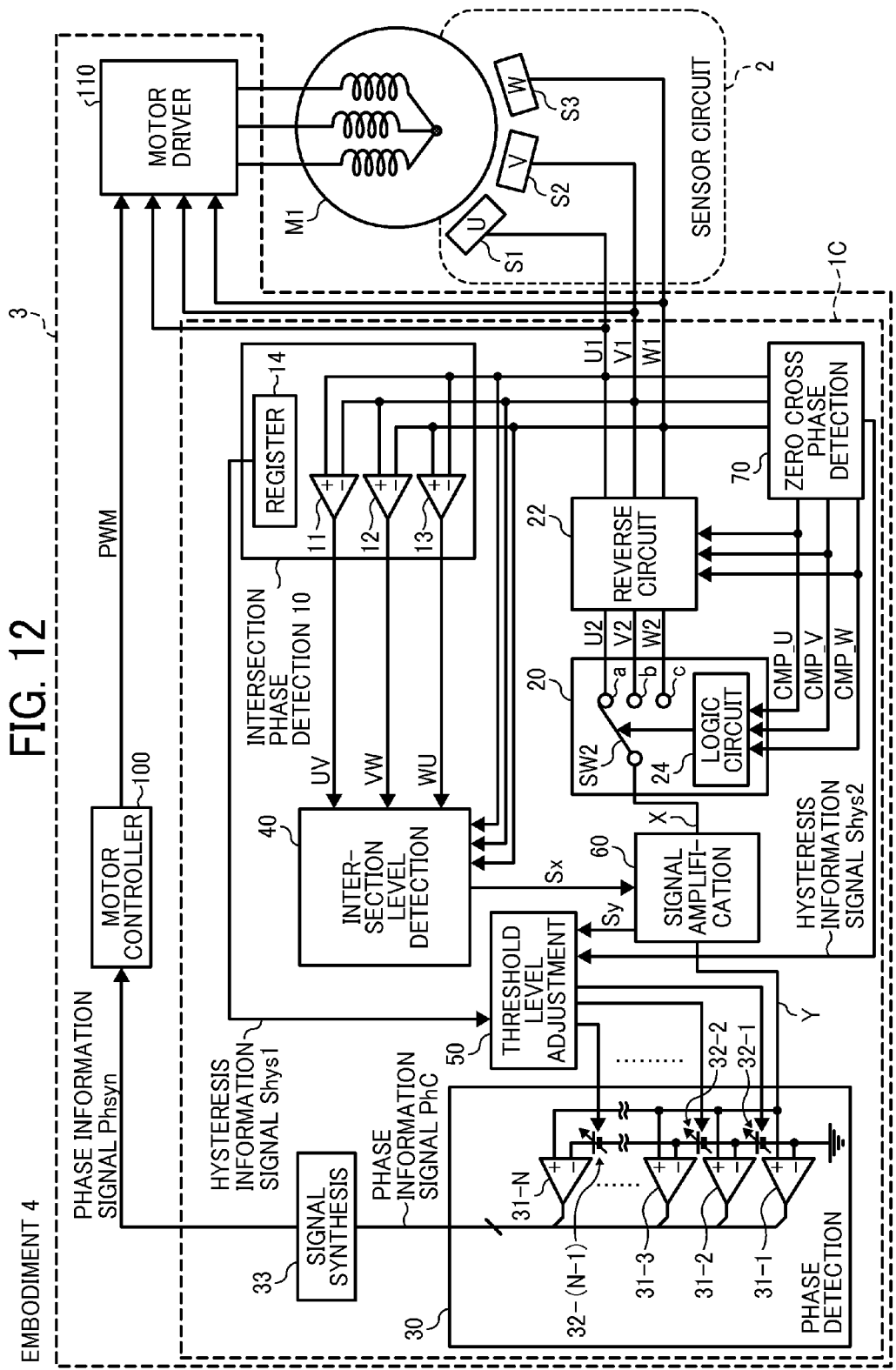
FIG. 12 is a block diagram illustrating the configuration of a motor device according to embodiment 4 of the present disclosure.

FIG. 12 is a block diagram illustrating the configuration of the motor device according to embodiment 4 of the present disclosure. In FIG. 12, the motor relating to the embodiment 4 has the motor M1, the sensor circuit 2, and a motor drive controller 3. The motor drive controller 3 has the angle detector 1C relating to the embodiment 3, a signal synthesizing unit 33, a motor controller 100, and a motor driver 110. The signal synthesizing unit 33 generates a phase information signal Phsyn based on the phase information signal PhC and outputs it to the motor controller 100. The motor controller 100 generates a PWM signal based on the phase information signal Phsyn and outputs it to the motor controller 110. The motor driver 110 selectively applies a drive current to multiple motor coils based on the PWM signal of the motor controller 100 to rotate the rotor of the motor M1.

Figure 13:
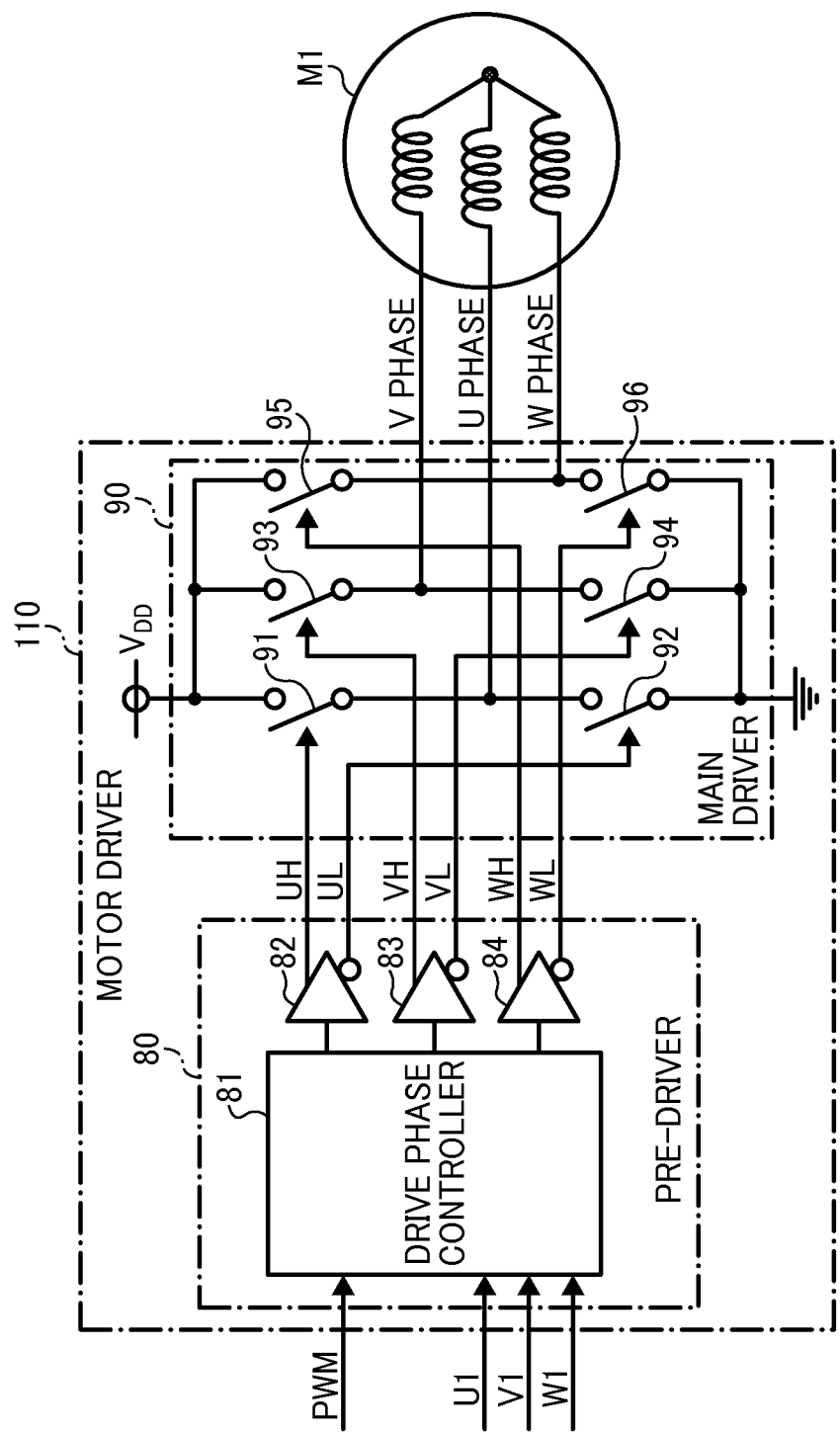
FIG. 13 is a block diagram illustrating the configuration of the motor drive unit 110 illustrated in FIG. 12.

FIG. 13 is a block diagram illustrating the configuration of the motor driver 110 illustrated in FIG. 12. The motor driver 110 has a pre-driver 80 and a main driver 90 as illustrated in FIG. 13. For example, the three phase coil to drive the motor M1 being as a brushless DC motor are defined as U phase, V phase, and W phase and one end of each coil is Y-connected in the motor M1. The main driver 90 is configured to have high side switch elements 91, 93, and 95 connected to the power supply and low side switch elements 92, 94, and 96 at each of the other ends of the coils. Furthermore, control signals UH, UL, VH, VL, WH, and WL of the switch to drive the switch elements 91 to 96 of each phase are output from the pre-driver 80.

Figure 14:
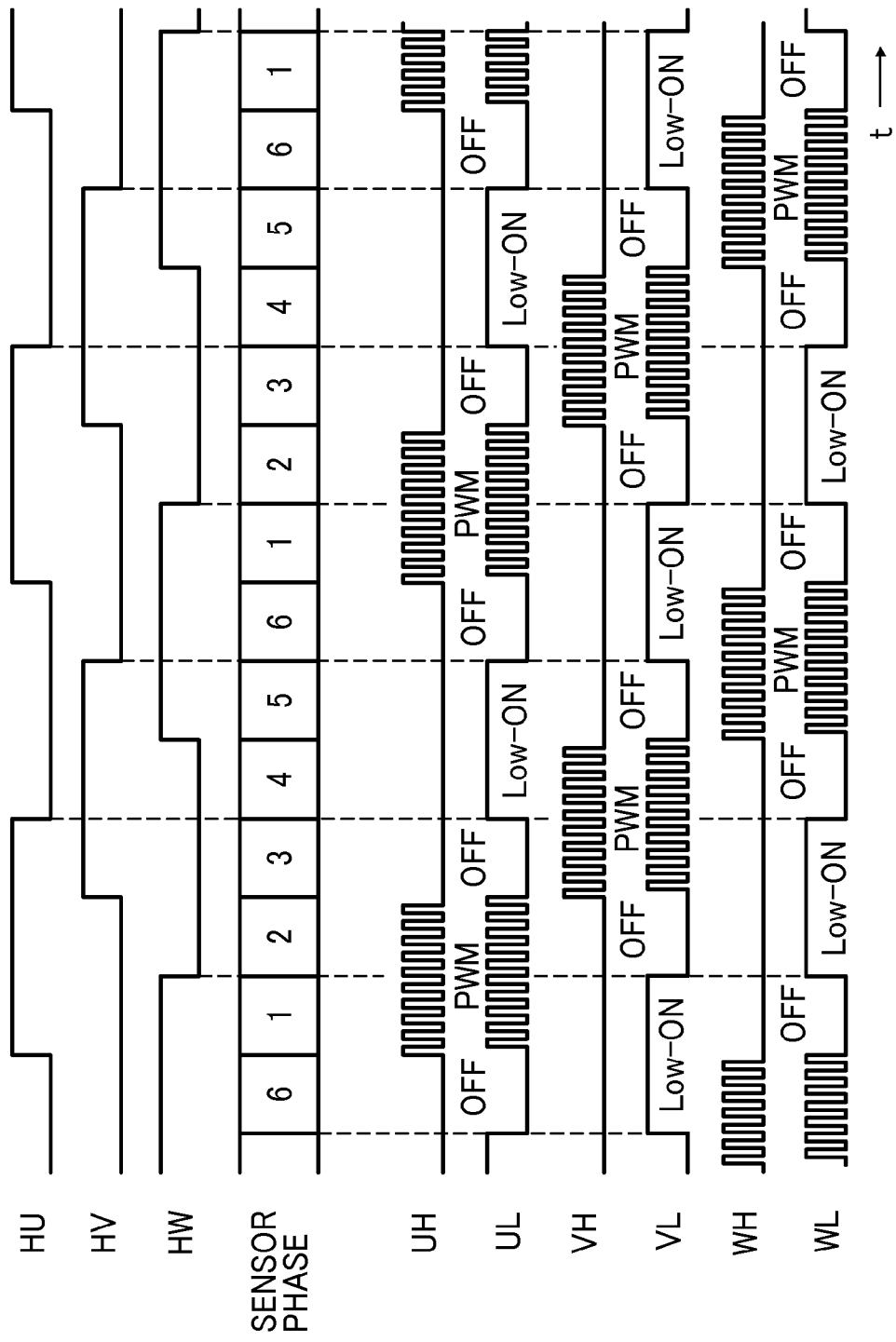
FIG. 14 is a timing diagram of each signal indicating operation of the motor drive unit 110 illustrated in FIG. 13.

In FIG. 13, the pre-drive 80 has a drive phase controller 81 and three drive amplifiers 82, 83 and 84. The drive phase controller 81 selectively and sequentially outputs the PWM signal from the motor controller 100 to one of the drive amplifiers 82, 83 and 84 based on the phase detection signals U2, V2, and W2. The drive amplifier 82 generates a pair of control signals UH and UL based on the output from the drive phase controller 81 to control on and off of the switch element 91 on the high side by the control signal UH and the switch element 92 on the low side by the control signal UL. The drive amplifier 83 generates a pair of control signals VH and VL based on the output from the drive phase controller 81 to control on and off of the switch element 93 on the high side by the control signal VH and the switch element 94 on the low side by the control signal VL. The drive amplifier 84 generates a pair of control signals WH and WL based on the output from the drive phase controller 81 to control on and off of the switch element 95 on the high side by the control signal WH and the switch element 96 on the low side by the control signal WL. FIG. 14 is a timing diagram of each signal indicating operation of the motor drive unit 110 illustrated in FIG. 13. FIG. 14 illustrates examples of switching phases in the signal logic of the sensor signals U1, V1, and W1, which is a general driving method driving a brushless DC motor. The motor controller 100 illustrated in FIG. 12 controls the duty cycle of the PWM signal based on the correct phase information as much as possible of the motor M1 in rotation and outputs the PWM signal to the motor driver 110. The drive phase controller 81 illustrated in FIG. 13 generates commutation signals HU, HV, and HW indicating whether the signal levels of the sensor signals U1, V1, and W1 are individually equal to or greater than the zero cross level based on the sensor signals U1, V1, and W1. The drive phase controller 81 controls PWM-controls one of the drive amplifiers 82, 83, and 84 based on the commutation signals HU, HV, and HW and changes one pair of the control signals of one of the other two pairs of drive amplifiers to the low level. The drive phase controller 81 switches the control signal of the switch element on the high side of the last one drive amplifier to the low level and sets the control signal of the switch element on the low side to the high level. As a result, the drive phase controller 81 sorts to one state of the phase that synchronously rectifies on the PWM duty cycle, the phase that switches on only the switch elements on the low side, and the phase that switches off both of the switch elements on the high side and the low side.

According to the motor device relating to the embodiment 4 configured as described above, for example, usage of a commonalized sensors S1, S2, and S3 and sensor for commutating the coil current to drive the motor M1 constituted of a brush less DC motor obviates the need for an addition of more sensors. That is, in the motor drive controller 3, by using a commutation signal of the coil current by a sensor provided to a typical motor, a number of phase information by the angle detector 1 is acquired.

Variation Example

Figure 15:
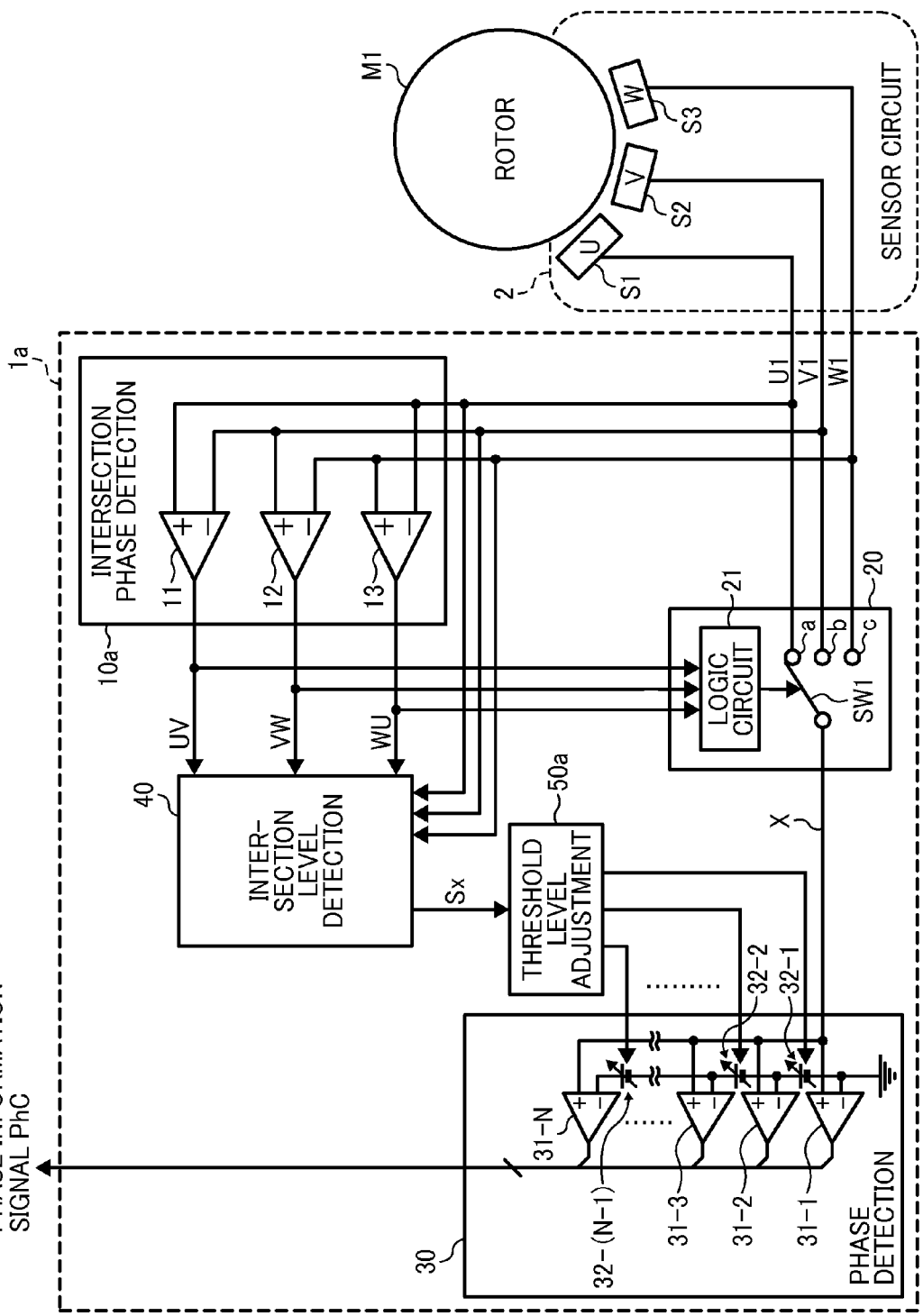
FIG. 15 is a block diagram illustrating a configuration of the angle detector 1a according to variation example 1 of the present disclosure together with the motor M1 and the sensor circuit 2.

FIG. 15 is a block diagram illustrating a configuration of the angle detector 1*a* relating to the embodiment 1 of the present disclosure together with the motor M1 and the sensor circuit 2. The angle detector 1 relating to the embodiment 1 of the present disclosure includes the register 14 to save hysteresis information and the angle detector 1A relating to the variation example of the embodiment 1 of the present disclosure includes the memory 51 but the present invention is not limited thereto. As seen in the variation example illustrated in FIG. 15, the maximum hysteresis error Vhys1 can be fixed in a circuit at the hysteresis comparator constituting the comparators 11 to 13. In FIG. 15, the intersection phase detector 10*a* is configured of the comparators 11 to 13 and the maximum hysteresis error Vhys1 of each thereof is fixed to a constant value (for example, 15 mV). The threshold level adjuster 50*a* adjusts the threshold levels Lth1 and Lth2 using the constant maximum hysteresis error Vhys1 without reading the maximum hysteresis error Vhys1 unlike the angle detectors 1 and 1A. Since the maximum hysteresis error Vhys1 of the hysteresis comparator is fixed in the circuit, the angle detector 1*a* does not need to store the hysteresis information on registers, etc.

The threshold level adjuster 50*a* can be configured to adjust threshold levels Lth1 and Lth2 using the fixed maximum hysteresis error Vhys1.

Figure 16:
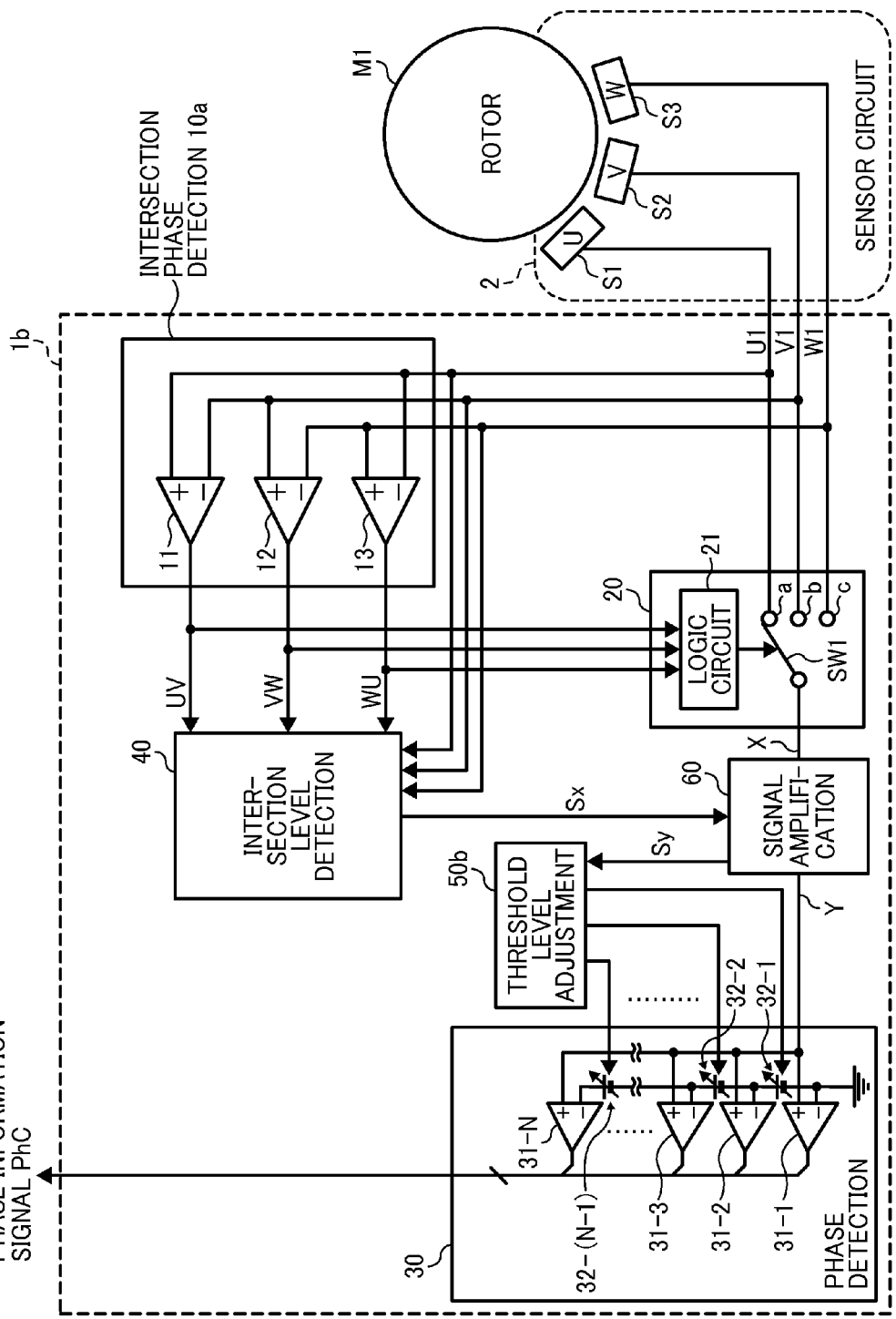
FIG. 16 is a block diagram illustrating a configuration of the angle detector 1b according to variation example 2 of the present disclosure together with the motor M1 and the sensor circuit 2.

FIG. 16 is a block diagram illustrating a configuration of the angle detector 1*b* relating to the variation example 2 of the present disclosure together with the motor M1 and the sensor circuit 2. Like the angle detector 1*a* of the variation example 1, the angle detector 1B relating to the embodiment 2 can be configured by fixing the maximum hysteresis error Vhys1 in the circuit. In FIG. 16, the threshold level adjuster 50*b* of the angle detector 1*b* adjusts the threshold levels Lth3 and Lthe4 using the maximum hysteresis error Vhys2 which is obtained by multiplying the fixed maximum hysteresis error Vhys1 by the signal amplification rate a times like the angle detector 1B.

Figure 17:
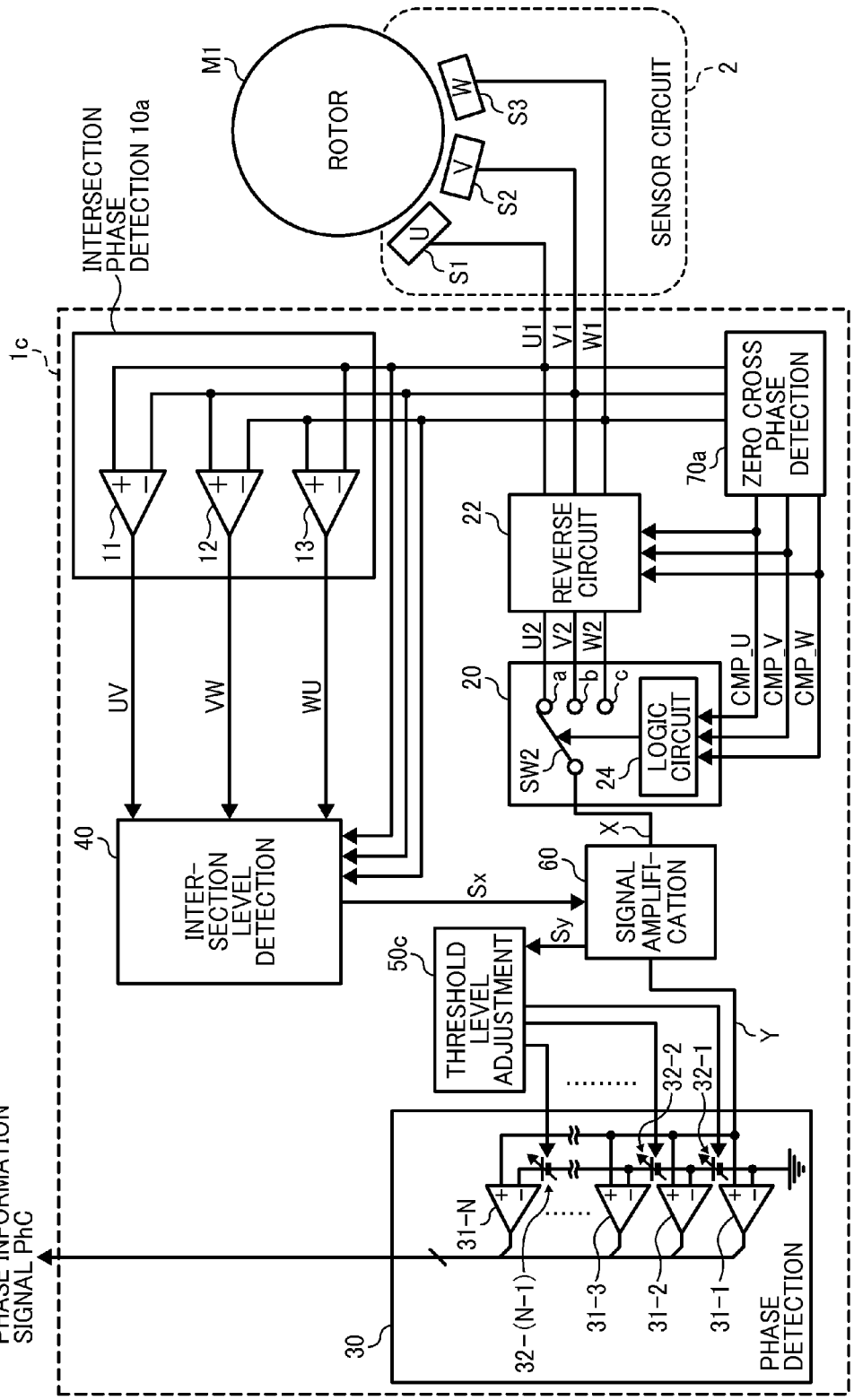
FIG. 17 is a block diagram illustrating a configuration of the angle detector 1c according to variation example 3 of the present disclosure together with the motor M1 and the sensor circuit 2.

FIG. 17 is a block diagram illustrating a configuration of the angle detector 1*c* relating to the variation example 3 of the present disclosure together with the motor M1 and the sensor circuit 2. Like the angle detector 1*a* of the variation example 1, the angle detector 1C relating to the embodiment 3 can be configured by fixing the maximum hystereses errors Vhys1 and Vhys3 in the circuit. In FIG. 17, the zero cross phase detector 70*a* of the angle detector 1*c* includes the comparators 71 to 73 and the maximum hysteresis error Vhys3 of each thereof is fixed to a constant value. In the angle detector 1*c*, the threshold level adjuster 50*c* adjusts the threshold levels Lth5 and Lthe6 using the fixed maximum hysteresis errors Vhys1 and Vhys3 like the angle detector 1C.

The angle detectors 1, 1B, and 1C relating each embodiment of the present disclosure include registers and write hysteresis information thereon. However, the present invention is not limited thereto. For example, the hysteresis information can be stored in readable manner by the threshold level adjuster50. The hysteresis information indicating the hysteresis of each comparator can be stored on a memory or can be set from the exterior of an angle detector.

The angle detectors 1, 1A, 1B, 1C, 1*a*, 1*b*, and 1*c* relating to each embodiment of the present disclosure detect the rotational position of the motor M1 against the three phase sensor signals U1, V1, and W1 but the present invention is not limited thereto. It is possible to detect the rotational position of the motor M1 against multiple phase sensor signals. For example, in the two sensor signals U1 and V1 set with an electrical angle shift of 90°, by generating and overlapping the reverse phase signal of each sensor signal and taking the selection signal X based on the intersection of each sensor signal, the phase can be detected as in the embodiment 1.

The angle detectors 1, 1A, 1B, 1C, 1*a*, 1*b*, and 1*c* of each embodiment of the present disclosure take the same operations for multiple sensor processed signals which are obtained after particular signal-processing for the multiple sensor signals U1, V1, and W1 instead of the multiple sensor signals U1, V1, and W1. The same is true to the other embodiments.

The motor relating to the embodiment 4 of the present disclosure has a motor drive controller 3 having the angle detector 1C but the present disclosure is not limited thereto. The motor drive controller relating to the present disclosure can have the angle detectors 1, 1A, 1B, 1C, 1*a*, 1*b*, and 1*c*. The motor relating to the present disclosure can have the motor drive controller. Moreover, the drive phase controller 81 can use the zero cross phase detection signals CMP_U, CMP_V, and CMP_W as commutation signals HU, HV, and HW.

Therefore, the drive phase controller 81 can reduce the circuit area.

According to a first aspect of the present disclosure, an angle detector includes an intersection phase detector to compare each pair of either multiple sensor signals or multiple sensor processed signals obtained by processing the multiple sensor signals with signal processing and generate and output each intersection phase detection signal indicating a phase at which a signal level difference of the each pair is a first maximum hysteresis error after signal levels of signals of the each pair match as a phase of an intersection of the each pair, each of the multiple sensor signals having a signal level corresponding to a rotational position of a rotor of a motor having multiple coils, an intersection level detector to detect each intersection level being as a signal level of each intersection and generate and output multiple intersection level signals indicating the each intersection level detected, a signal selector to single out a selection signal of the either of the multiple sensor signals or multiple sensor processed signals; a phase detector to detect that a signal level of the selection signal selected by the signal selector has reached a threshold level corresponding to a phase of the rotor and output a phase information signal indicating the phase corresponding to the threshold level and a threshold level adjuster to adjust the threshold level based on the intersection level signal and the first maximum hysteresis error.

According to a second aspect of the present disclosure, the angle detector mentioned in the first aspect of the present disclosure, wherein the threshold level adjuster shifts the threshold level by the first maximum hysteresis error.

According to a third aspect of the present disclosure, in the angle detector mentioned in the first or the second aspect of the present disclosure, the threshold level adjuster sets as the threshold levels each of the signal levels obtained by equally dividing a range between a signal level which is by the first maximum hysteresis error closer to one intersection level of two adjacent intersections than another intersection level thereof and the one intersection level.

According to a fourth aspect of the present disclosure, in the angle detector mentioned in any one of the first to third aspect of the present disclosure, in the either of the multiple sensor signals or the multiple sensor processed signals, the signal level adjuster adjusts the threshold level for a phase section containing a phase section selected as the selection signal.

According to a fifth aspect of the present disclosure, the angle detector mentioned in any one of the first to fourth aspect of the present disclosure includes a signal amplifier to amplify and output the either one of the multiple sensor signals and the multiple sensor processed signals to match the each intersection level with a signal level, wherein the threshold level adjuster multiplies the first maximum hysteresis error by a signal amplification rate of the signal amplifier and adjusts the threshold level based on an amplified maximum hysteresis error of a multiplication result.

According to a sixth aspect of the present disclosure, the angle detector mentioned in any one of the first to fifth aspect of the present disclosure includes a zero cross phase detector to detect a phase as a zero cross phase at which each of the either one of the multiple sensor signals and the multiple sensor processed signals matches a signal level and thereafter is a second maximum hysteresis error away therefrom, wherein the threshold level adjuster adjusts the threshold level based on the intersection level signal, the first maximum hysteresis error, and the second maximum hysteresis error.

According to a seventh aspect of the present disclosure, in the angle detector mentioned in any one of the first to sixth aspect of the present disclosure, the single selector singles outs and combines a selection signal of the either one of the multiple sensor signals and the multiple sensor processed signals for each phase section between adjacent intersections to generate a selection signal.

According to an eighth aspect of the present disclosure, in the angle detector mentioned in any one of the first to sixth aspect of the present disclosure, the phase section between the intersections is a section corresponding to a range corresponds to a section of from an electrical angle of from 30° to an electrical angle of 60°.

According to a ninth aspect of the present disclosure, a motor drive controller includes the angle detector mentioned in any one of the first to eighth aspect of the present disclosure, wherein a motor is driven and controlled based on a phase information signal from the angle detector.

According to a tenth aspect of the present disclosure, a motor device includes the motor drive controller of the ninth aspect of the present disclosure and a motor driven and controlled by the motor drive controller.

The rotational position of the motor of a motor can be precisely detected even when a comparator with the maximum hysteresis error is used to prevent malfunction caused by noises.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An angle detector comprising:
   an intersection phase detector to compare each pair of either one of multiple sensor signals and multiple sensor processed signals obtained by processing the multiple sensor signals with signal processing and generate and output each intersection phase detection signal indicating a phase at which a signal level difference of the each pair is a first maximum hysteresis error after signal levels of signals of the each pair match as a phase of an intersection of the each pair, each of the multiple sensor signals having a signal level corresponding to a rotational position of a rotor of a motor having multiple coils,
   an intersection level detector to detect each intersection level being as a signal level of each intersection and generate and output multiple intersection level signals indicating the each intersection level detected,
   a signal selector to single out a selection signal of the either one of the multiple sensor signals or the multiple sensor processed signals;
   a phase detector to detect that a signal level of the selection signal selected by the signal selector has reached a threshold level corresponding to a phase of the rotor and output a phase information signal indicating the phase corresponding to the threshold level and
   a threshold level adjuster to adjust the threshold level based on the intersection level signal and the first maximum hysteresis error.

2. The angle detector according to claim 1, wherein the threshold level adjuster shifts the threshold level by the first maximum hysteresis error.

3. The angle detector according to claim 1, wherein the threshold level adjuster sets as the threshold levels each of the signal levels obtained by equally dividing a range between a signal level which is by the first maximum hysteresis error closer to one intersection level of two adjacent intersections than another intersection level thereof and the one intersection level.

4. The angle detector according to claim 1, wherein, in the either one of the multiple sensor signals or the multiple sensor processed signals, the signal level adjuster adjusts the threshold level for a phase section containing a phase section selected as the selection signal.

5. The angle detector according to claim 1, further comprising a signal amplifier to amplify and output the either one of the multiple sensor signals and the multiple sensor processed signals to match the each intersection level with a signal level, wherein the threshold level adjuster multiplies the first maximum hysteresis error by a signal amplification rate of the signal amplifier and adjusts the threshold level based on an amplified maximum hysteresis error of a multiplication result.

6. The angle detector according to claim 1, further comprising a zero cross phase detector to detect a phase as a zero cross phase at which each of the either one of the multiple sensor signals and the multiple sensor processed signals matches a signal level and thereafter is a second maximum hysteresis error away therefrom wherein the threshold level adjuster adjusts the threshold level based on the intersection level signal, the first maximum hysteresis error, and the second maximum hysteresis error.

7. The angle detector according to claim 1, wherein the single selector singles outs and combines a selection signal of the either one of the multiple sensor signals and the multiple sensor processed signals for each phase section between adjacent intersections to generate a selection signal.

8. The angle detector according to claim 7, wherein the phase section between the intersections is a section corresponding to a range corresponds to a section of from an electrical angle of from 30° to an electrical angle of 60°.

9. A motor drive controller comprising:

the angle detector of claim 1, wherein a motor is driven and controlled based on a phase information signal from the angle detector.

10. A motor device comprising:

the motor drive controller of claim 9; and a motor driven and controlled by the motor drive controller.

* * * * *